US010035300B2

(12) United States Patent
Encinosa et al.

(10) Patent No.: US 10,035,300 B2
(45) Date of Patent: Jul. 31, 2018

(54) SYSTEM AND METHOD FOR MANUFACTURING A STIFFENED COMPOSITE STRUCTURE

(71) Applicant: The Boeing Company, Chicago, IL (US)

(72) Inventors: Joe Encinosa, Lake Forest Park, WA (US); Andrew Barwick, Edgewood, WA (US); Robert Bick, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 194 days.

(21) Appl. No.: 14/746,844

(22) Filed: Jun. 23, 2015

(65) Prior Publication Data

US 2016/0375631 A1 Dec. 29, 2016

(51) Int. Cl.
*B29D 99/00* (2010.01)
*B29C 65/48* (2006.01)
(Continued)

(52) U.S. Cl.
CPC .............. *B29C 65/48* (2013.01); *B29C 33/26* (2013.01); *B29C 65/56* (2013.01);
(Continued)

(58) Field of Classification Search
CPC ..... Y02T 50/433; B29C 69/004; B29C 65/48; B29C 65/56; B29C 33/26; B29C 65/7802;
(Continued)

(56) References Cited

U.S. PATENT DOCUMENTS 5,087,187 A * 2/1992 Simkulak ................ B29C 43/32
264/258
5,538,589 A * 7/1996 Jensen .................. B29C 69/004
100/211

(Continued)

FOREIGN PATENT DOCUMENTS

| EP | 2380720 | 10/2011 |
| WO | WO2004043679 | 5/2004 |
| WO | WO2008020158 | 2/2008 |

OTHER PUBLICATIONS

Andersen et al.; A turning device for turning a first mould part for manufacturing a wind turbine blade part relative to a second mould part; EP 3025836.*

(Continued)

*Primary Examiner* — Michael N Orlando
*Assistant Examiner* — Christian Roldan

(57) ABSTRACT

A system for manufacturing a stiffened composite panel may include a stiffener tooling assembly, a caul plate, and a rotatable strongback. The stiffener tooling assembly may include stiffener tooling configured to support a plurality of composite stiffeners. The caul plate may have a layup surface for laying up a composite skin. The strongback may be releasably coupled to the caul plate. The system may include a plurality of hinges each having a fixed hinge portion and a movable hinge portion. The movable hinge portion may be coupled to the strongback for rotation thereof between an open position and a closed position for engagement of the caul plate with the stiffener tooling assembly.

21 Claims, 33 Drawing Sheets

(51) Int. Cl.
*B29C 33/26* (2006.01)
*B29C 65/56* (2006.01)
*B29L 31/30* (2006.01)

(52) U.S. Cl.
CPC .. *B29D 99/0014* (2013.01); *B29L 2031/3076* (2013.01); *B29L 2031/3085* (2013.01); *Y02T 50/433* (2013.01)

(58) Field of Classification Search
CPC ............ B29C 66/8324; B29C 66/8242; B29C 66/434; B29D 99/0014; B29L 2031/3076; B29L 2031/3085
USPC ................................ 156/307.1, 583.8, 583.9
See application file for complete search history.

(56) References Cited

U.S. PATENT DOCUMENTS

| | | | |
|---|---|---|---|
| 7,270,722 B2 | 9/2007 | Navas et al. | |
| 7,464,508 B2 | 12/2008 | Fournie et al. | |
| 9,689,266 B2* | 6/2017 | Bech | B29C 33/26 |
| 2006/0034971 A1* | 2/2006 | Olsen | B29C 33/26 |
| | | | 425/451.5 |
| 2013/0239379 A1* | 9/2013 | Rajasingam | B29C 33/12 |
| | | | 29/23.51 |
| 2014/0374013 A1 | 12/2014 | Hansen | |

OTHER PUBLICATIONS

PH Windsolutions, "Mould_Turning_Systems," retrieved Mar. 16, 2015.
Gurit Tooling, "Wind Blade Mould Hinge System," retrieved Jun. 14, 2015.

\* cited by examiner

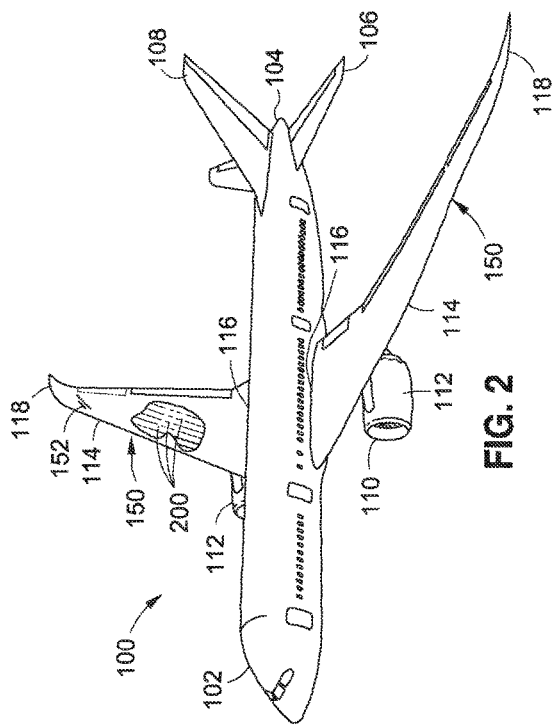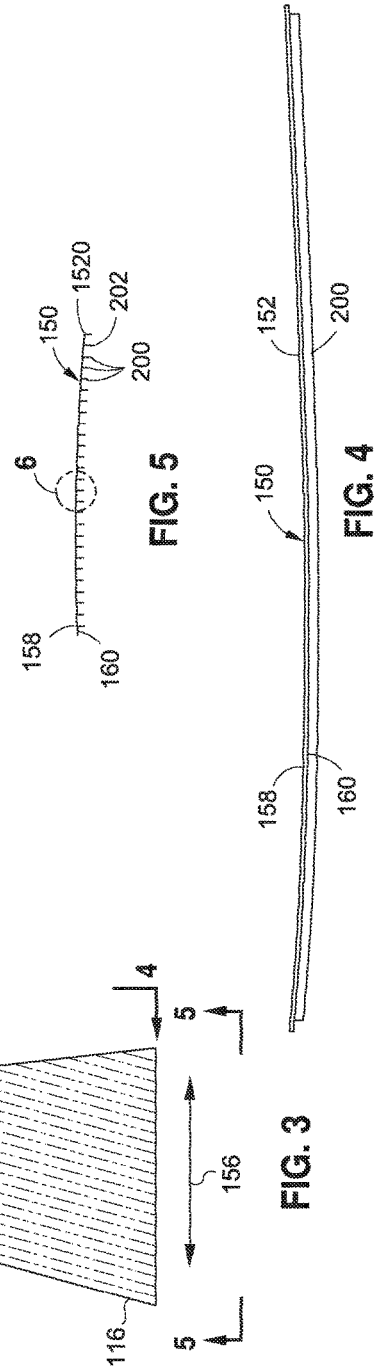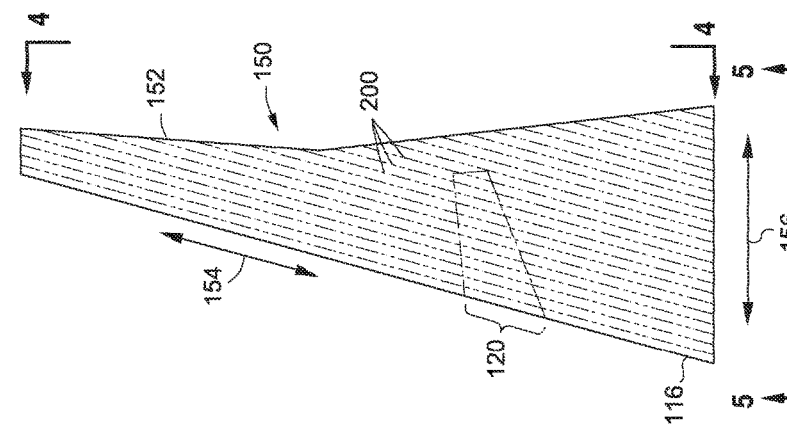

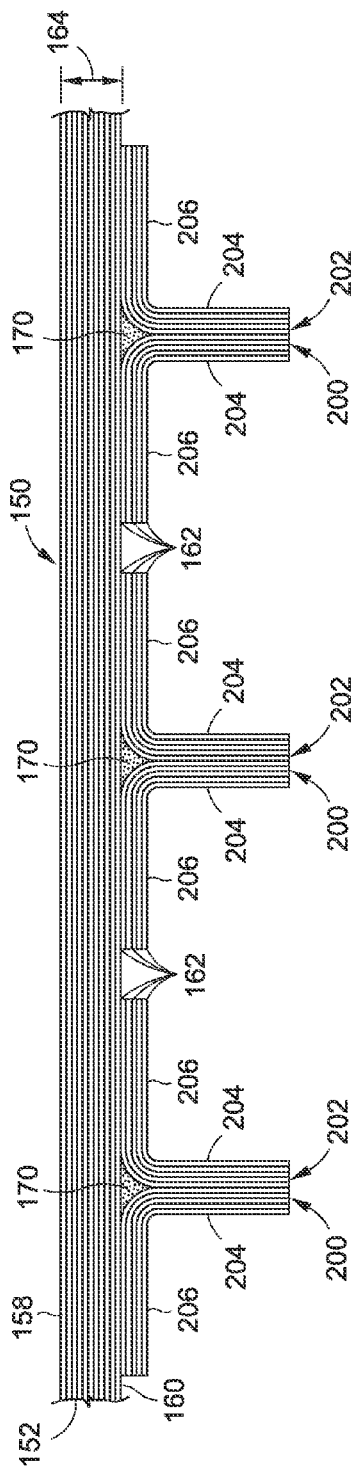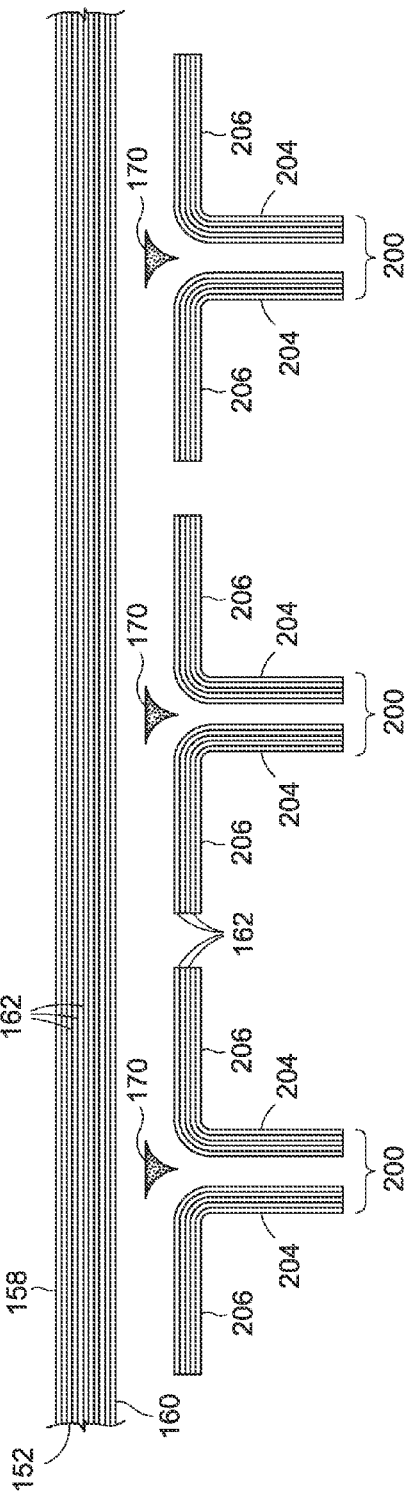

SYSTEM AND METHOD FOR MANUFACTURING A STIFFENED COMPOSITE STRUCTURE

FIELD

The present disclosure relates generally to the manufacturing of composite structures and, more particularly, to a system and method of manufacturing a stiffened composite structure.

BACKGROUND

Certain types of composite structures include reinforcing elements to improve the strength and stiffness characteristics of the composite structure. For example, the wings of an aircraft may include composite skin panels which may be stiffened with composite stiffeners. The composite stiffeners may be located on an inner side of the composite skin panel and may increase the out-of-plane bending stiffness of the composite wing skin.

Conventional methods of forming stiffened composite skin panels may involve laying up composite plies on a skin layup tool to form an uncured composite skin. One or more composite stiffeners may then be individually laid up or mounted on the composite skin. The composite assembly may be vacuum-bagged and compaction pressure may be applied to debulk the composite assembly. Heat may also be applied to cure the composite assembly and establish the outer mold line surface finish of the composite skin. Unfortunately, the conventional method of laying up a composite skin and then individually installing composite stiffeners results in a relatively long process flow time for manufacturing a stiffened composite skin panel.

In attempts to reduce the process flow time, composite stiffeners may be separately laid up on stiffener tooling to form a stiffener assembly. A skin layup tool containing an uncured composite skin may be applied to the stiffener assembly to form a skin-stiffener assembly which may be vacuum-bagged and positioned in an oven or autoclave for curing to produce a stiffened composite skin panel. Unfortunately, the installation of the composite skin onto the stiffener assembly may require the use of a crane for lifting and positioning the skin layup tool which may present challenges in maintaining the safety of the workplace in addition to challenges in accurately aligning the composite skin with the composite stiffeners.

Furthermore, the skin layup tool must be relatively stiff to avoid distorting the contour of the outer mold line on the layup surface during layup of the composite skin. Unfortunately, a relatively stiff skin layup tool may present challenges in applying uniform compaction pressure to the composite skin during debulking. In addition, a relatively stiff skin layup tool may have a relatively high mass which may result in the application of excessive compaction pressure onto the composite skin, the composite stiffeners, and the stiffener tooling. Furthermore, the relatively high mass of a stiff skin layup tool may increase the amount of time required for heating up the composite assembly to the cure temperature and cool down to ambient temperature after the composite assembly is cured.

As can be seen, there exists a need in the art for system and method for manufacturing a stiffened composite skin panel that allows for layup of the composite skin in parallel with the layup of the composite stiffeners, and which additionally allows for the application of uniform compaction pressure to the composite skin during debulking while avoiding the need for a crane for lifting and positioning the skin layup tool.

SUMMARY

The above-noted needs associated with manufacturing integrally stiffened composite structures are specifically addressed and alleviated by the present disclosure which provides a system including a stiffener tooling assembly, a caul plate, and a rotatable strongback releasably coupled to the caul plate. The stiffener tooling assembly may include stiffener tooling configured to support a plurality of composite stiffeners. The caul plate may have a layup surface for laying up a composite skin. The strongback may be releasably coupled to the caul plate. The system may further include a plurality of hinges each having a fixed hinge portion and a movable hinge portion. The fixed hinge portion may be coupled to a fixed object such as a shop floor of a manufacturing facility. The movable hinge portion may be coupled to the strongback for rotation thereof between an open position and a closed position for engagement of the caul plate with the stiffener tooling assembly. In an embodiment, the system may include a plurality of linear actuators positioned on a side of the strongback opposite the hinges when the strongback is in the closed position. The linear actuators of the posts and hinges may be actuated in a coordinated manner for vertically lowering the strongback and caul plate from a hover position to a docked position such that the composite skin is placed into contact with the composite stiffeners.

Also disclosed is a method for manufacturing a stiffened composite skin panel. The method may include providing a caul plate including a layup surface supporting a composite skin. The method may additionally include providing a composite stiffener assembly including one or more composite stiffeners laid up on stiffener tooling. Furthermore, the method may include releasably coupling a strongback to one of the caul plate and the stiffener tooling assembly using a plurality of hinges each having a fixed hinge portion and a movable hinge portion. The fixed hinge portion may be coupled to a fixed object. The movable hinge portion may be coupled to the strongback. Method may include rotating the strongback coupled to one of the caul plate and the stiffener tooling assembly from an open position to a closed position for engagement of the composite skin with the composite stiffeners to form a stiffened composite skin panel.

The features, functions and advantages that have been discussed can be achieved independently in various examples of the present disclosure or may be combined in yet other examples, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 2 is perspective illustration of an aircraft having wings formed of one or more stiffened composite skin panels;

FIG. 3 is a plan view of a wing skin configured as a stiffened composite skin panel including a composite skin and a plurality of composite stiffeners;

FIG. 4 is a side view of the stiffened composite skin panel of FIG. 3;

FIG. 5 is an end view of the stiffened composite skin panel of FIG. 3;

FIG. 6 is a magnified view of a portion of an example of a stiffened composite skin panel having a composite skin and a plurality of composite stiffeners;

FIG. 7 is an exploded view of a portion of a stiffened composite skin panel;

FIG. 38 is an end view of the system showing the caul plate vertically lowered from the hover position to the docked position such that the composite skin is mated to the composite stiffeners;

DETAILED DESCRIPTION

Figure 1:
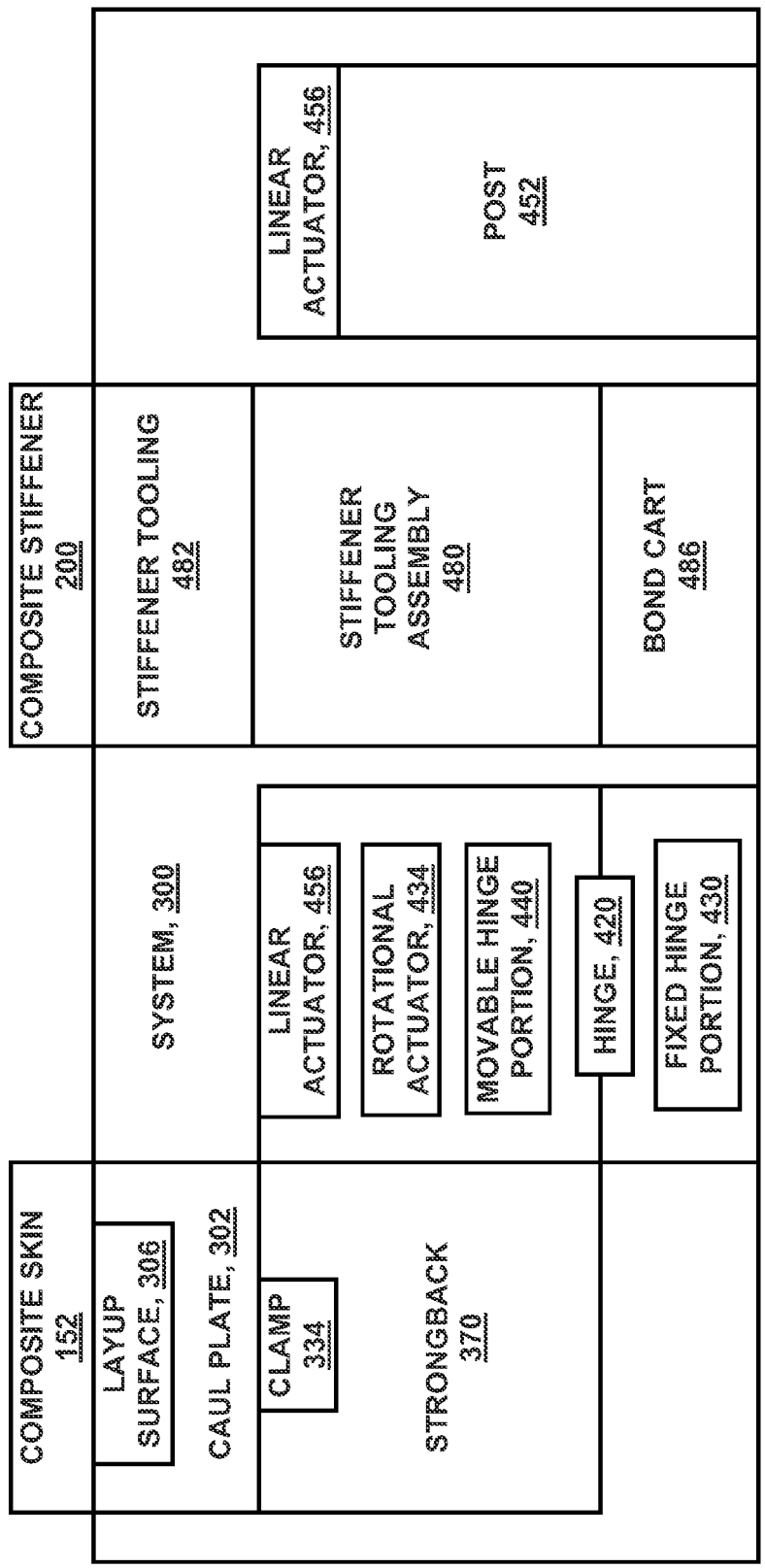
FIG. 1 is a block diagram of an example of a system for manufacturing a stiffened composite skin panel.

Referring now to the drawings wherein the showings are for purposes of illustrating various examples of the present disclosure, shown in FIG. 1 is a block diagram of an example of a system 300 for manufacturing a stiffened composite skin panel 150 (FIG. 2). The system 300 may include a stiffener tooling assembly 480 including stiffener tooling 482 such as stiffener form blocks 484 configured to support a plurality of cured or uncured composite stiffeners 200. In one example, one or more of the composite stiffeners 200 may be formed as a layup of uncured composite plies 162 (FIG. 6). The composite plies 162 may be formed of pre-impregnated fiber-reinforced polymer-matrix material (prepreg). The stiffener tooling assembly 480 may be supported on a bond cart 486.

In addition, the system 300 may include a caul plate 302 which may also function as a layup mandrel having a layup surface 306 configured for laying up a composite skin 152. The layup of the composite skin 152 may be formed as a laminate of uncured composite plies 162. The composite plies 162 may also be prepreg composite plies. The caul plate 302 may be formed as a relatively lightweight structure to allow the caul plate 302 to be locally compliant during the process of debulking the composite skin 152 when mated to the composite stiffener 200. In addition, forming the caul plate 302 as a lightweight structure may minimize the thermal mass of the caul plate 302 which may reduce the amount of time required for heat-up and cool-down of the caul plate 302/stiffener tooling assembly 480 during the process of co-curing or co-bonding the composite skin 152 to the composite stiffeners 200.

The system 300 may further include a strongback 370. The strongback 370 may extend along a spanwise direction 154 and/or a chordwise direction 156 of the caul plate 302, and may be releasably coupled to the caul plate 302 such as by using one or more clamping mechanisms. For example, a plurality of clamps 334 may be mounted on the caul plate and/or if the strongback for releasably coupling a backside 304 (e.g., opposite the layup surface 306) of the caul plate 302 to the strongback 370. The strongback 370 may be formed as a relatively stiff frame or truss structure 372 for increasing the global stiffness of the caul plate 302. In one example, the strongback 370 may be formed of structural steel or other high-strength material and may be configured to support the caul plate 302 during layup of the composite skin 152. In this regard, the relatively stiff strongback 370 may prevent distortion of the layup surface 306 of the caul plate 302 during layup of the composite skin 152. In addition, the strongback 370 may support the caul plate 302 during rotation of the caul plate 302 onto the stiffener tooling assembly 480. With the strongback 370 removed from the caul plate 302, the caul plate 302 may be locally compliant to facilitate out-of-plane flexing of the caul plate 302 to accommodate spanwise and/or chordwise variations in the amount by which the laminate thickness 164 is reduced during debulking and/or during cure (e.g., due to cure shrinkage) of the composite plies 162 that make up the composite skin 152.

Figure 23:
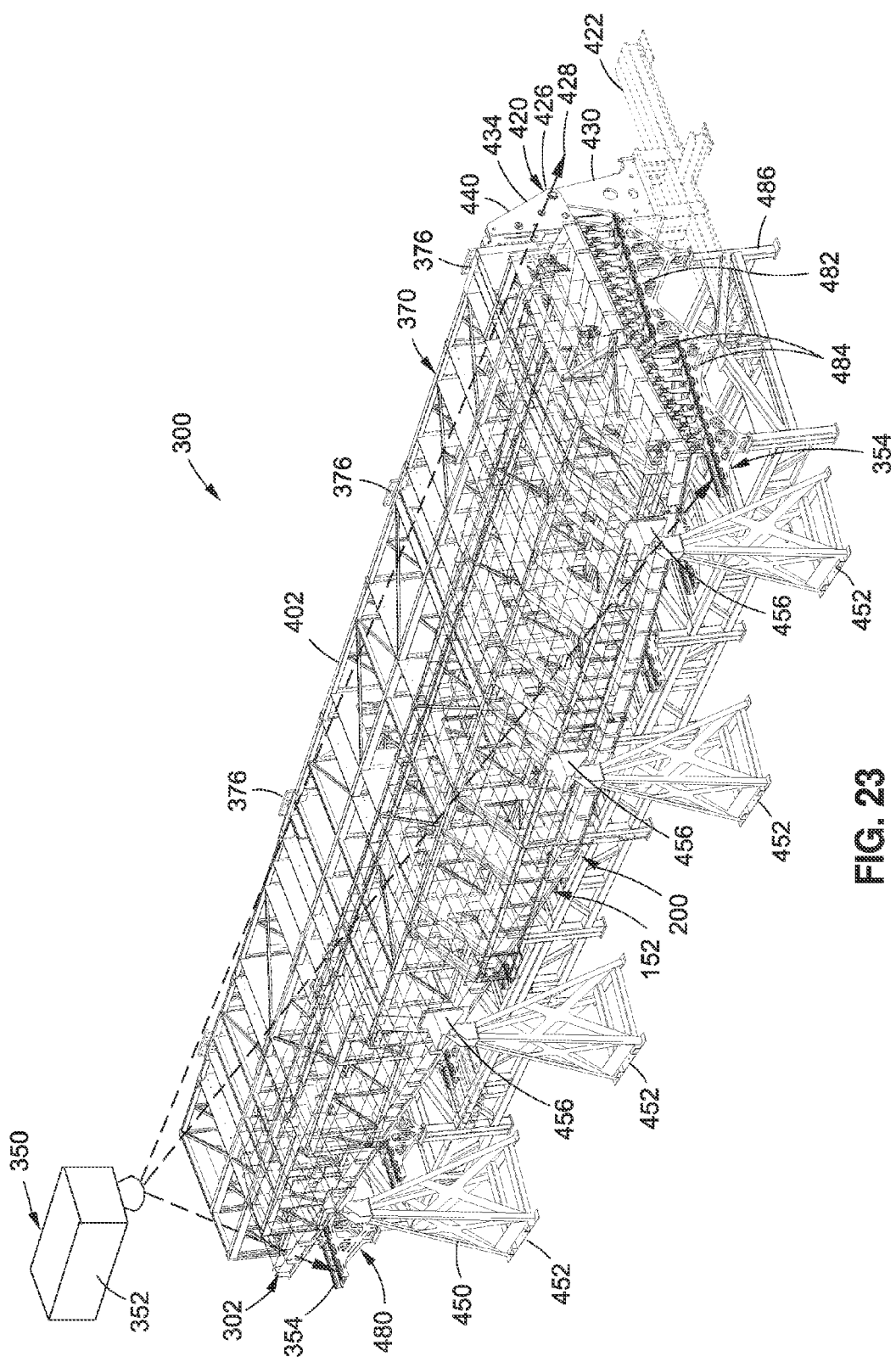
FIG. 23 is a perspective view of the system showing the caul plate and strongback in the closed position (e.g., hover position or docked position)

The system 300 may include one or more hinges 420 for rotating the strongback 370. Each one of the hinges 420 may include a fixed hinge portion 430 and a movable hinge portion 440 rotatably interconnected by a hinge pin 426. The fixed hinge portion 430 may be coupled to a fixed object 424 such as a shop floor. The movable hinge portion 440 may be coupled to the strongback 370. The hinge 420 may include one or more rotational actuators 434 for rotating the strongback 370 between an open position 400 (FIG. 8) and a closed position 402 (FIG. 23). The system 300 may also include one or more linear actuators 456 for supporting the mass of the strongback 370 and/or vertically lowering the caul plate 302 from a hover position 404 to a docked position 406 once the strongback 370 is rotated from the open position 400 to the closed position 402. In one example, each one of the hinges 420 may include a linear actuator 456 (e.g., a z-axis actuator). In addition, the system 300 may include one or more posts 452, one or more of which may have a linear actuator 456.

The linear actuators 456 of the hinges 420 and posts 452 may be operated in a coordinated manner to support the mass of the strongback 370 and vertically lower the strongback 370 from a hover position 404 to a docked position 406 in a controlled manner to allow for accurate alignment of the composite skin 152 (e.g., supported on the caul plate 302) with composite stiffeners 200 (e.g., supported on the stiffener tooling 482), as described in greater detail below. Once the composite skin 152 and composite stiffeners 200 are moved into contact with one another to form a composite assembly, the strongback 370 may be detached from the caul plate 302 and rotated away from the caul plate 302 toward the open position 400. The composite assembly sandwiched between the caul plate 302 and the stiffeners tooling may be vacuum bagged for debulking and/or moved into an oven or autoclave for co-curing or co-bonding the composite skin 152 to the composite stiffeners 200 with the caul plate 302 docked to the stiffener tooling assembly 480.

In an embodiment not shown, instead of the strongback 370 being releasably coupled or releasably clamped to the caul plate 302 for rotation of the strongback-supported caul plate 302 onto a stationary stiffener tooling assembly 480, the strongback 370 may be releasably coupled or releasably clamped to the stiffener tooling assembly 480 to allow for rotation of the strongback-supported stiffener tooling assembly 480 onto a stationary caul plate 302. In this regard, although the system 300 and method of the present disclosure is described in the context of the strongback 370 being releasably coupled to the caul plate 302, any one or more of the structural components, functional capabilities, and operational steps described herein may be implemented in the configuration wherein the strongback 370 is releasably coupled to the stiffener tooling assembly 480.

FIG. 2 is perspective illustration of an aircraft 100 which may include one or more composite structures formed of stiffened composite skin panels 150. The aircraft 100 may include a fuselage 102 having an empennage 104 including a horizontal tail 106 and a vertical tail 108 which may also be formed of stiffened composite skin panels 150. The aircraft 100 may include a pair of wings 114 and may include one or more propulsion units 110. For example, the propulsion units 110 may include engine nacelles 112 mounted to the wings 114. The wings 114 may include wing skins defining the upper and/or lower surface of the wings 114 and which may be formed as stiffened composite skin panels 150.

FIG. 3 is a plan view of a wing skin configured as a stiffened composite skin panel 150. The wing skin may extend from a root portion 116 to a tip portion 118 and may include a nacelle portion 120 at a location where the engine nacelles 112 are mounted to the wings 114. As described below, the wing skin may be formed of composite plies 162 which may be locally increased at certain areas along a spanwise direction 154 of the wing 114 to accommodate increased loads at such locations. For example, the root portion 116 may have a generally increased laminate thickness 164 relative to the tip portion 118. The nacelle portion 120 may have an increased laminate thickness 164 relative to the laminate thickness 164 at the root portion 116 to accommodate increased loads from the engine nacelles 112.

The stiffened composite skin panel 150 may be made up of a composite skin 152 and a plurality of composite stiffeners 200 which are shown oriented generally parallel to one another and extending along a spanwise direction 154 from the root portion 116 of the tip portion 118 of the wing skin. The composite skin 152 may be laid up on a layup surface 306 of the caul plate 302 as mentioned above. Likewise, the composite stiffeners 200 may be separately laid up on stiffener tooling 482. After separate layup of the composite skin 152 and composite stiffeners 200, the composite skin 152 and the composite stiffeners 200 may be assembled or mated using the rotatable strongback 370 disclosed herein. Once the composite skin 152 is mated to the composite stiffeners 200, the strongback 370 may be released or decoupled from the caul plate 302, and the strongback 370 may be rotated back to the open position leaving the caul plate docked to the stiffener tooling assembly 480. The layup surface 306 of the caul plate may be used as a caul surface for imparting the surface finish and outer mold line (OML) contour into the composite skin 152 during co-curing or co-bonding of the composite skin 152 to the composite stiffeners 200.

Although the presently-disclosed system 300 and method are described in the context of an integrally-stiffened composite wing skin for an aircraft 100, the system 300 and method may be implemented for forming composite structures for any vehicular or non-vehicular application, without limitation. In this regard, the system 300 and method may be implemented for forming any type of composite structure wherein an uncured composite skin 152 is co-cured or co-bonded with cured or uncured composite stiffeners 200. In addition, the system 300 and method may be implemented for assembling and co-bonding a cured composite skin 152 layup with uncured composite stiffeners 200.

FIG. 4 is a side view of the stiffened composite skin panel 150 of FIG. 3. In the example shown, the skin panel is shown having a curved shape extending from the root portion 116 to the tip portion 118. However, the stiffened composite skin panel 150 may have a planar shape and/or a contoured curvature along any portion of the skin panel. In addition, the curvature may extend along one or more directions such as along a spanwise direction 154 or a chordwise direction 156.

FIG. 5 is an end view of the stiffened composite skin panel 150 of FIG. 3 showing a plurality of composite stiffeners 200 formed on an inner mold line 158 surface of the stiffened composite skin panel 150. A plurality of the composite stiffeners 200 are shown uniformly distributed along a chordwise direction 156. However, the stiffened composite skin panel 150 may include any number of composite stiffeners 200 which may be distributed uniformly or non-uniformly.

FIG. 6 is a magnified view of a portion of the stiffened composite skin panel 150 of FIG. 5 comprised of a composite skin 152 and a plurality of composite stiffeners 200. As indicated above, the composite skin 152 and the composite stiffeners 200 may be formed of a plurality of composite plies 162. The composite plies 162 may be made up of a plurality of reinforcing fibers (not shown) surrounded by matrix material (not shown). The reinforcing fibers may be high-modulus or high-strength fibers formed of carbon, glass, or other fiber material. The fibers in a composite ply may be continuous fibers that may be commonly aligned or oriented in a single direction (e.g., unidirectional fibers), or the fibers in a composite ply may be woven together in two or more directions in a fabric arrangement (not shown). As indicated above, the composite plies 162 may be provided as pre-impregnated composite plies 162 wherein the reinforcing fibers may be pre-impregnated with a polymeric matrix material (e.g., prepreg) such as thermosetting resin (e.g., epoxy). Although not shown, the composite skin 152 may be formed as a sandwich construction having a core (not shown) sandwiched between a pair of composite laminate face sheets (not shown), and is not limited to being formed as a solid laminate of composite plies 162.

FIG. 7 is an exploded view of a portion of the stiffened composite skin panel 150 of FIG. 6 illustrating a plurality of composite plies 162 that make up the composite skin 152. In the example shown, the composite stiffeners 200 are formed by side-by-side assembly of a plurality of inverted L-shaped composite elements. Each L-shaped composite element may include a flange 206 and a web 204 extending outwardly from the flange 206. The flanges 206 of a plurality of L-shaped composite elements may be assembled to the composite skin such that the flanges 206 are in contacting relation with the inner mold line 158 surface of the composite skin 152. The webs 204 of adjacent L-shaped composite elements may be disposed in back-to-back relation to one another to form a plurality of blade section 202 composite stiffeners 200. A radius filler 170 may be installed within notch formed between each adjacent pair of composite stiffeners 200. Although the present disclosure illustrates the composite stiffeners 200 as blade sections 202, the composite stiffeners 200 may be formed in other cross-sectional shapes including, but not limited to, a C-section, an I-section, a hat section, or other shapes.

Figure 8:
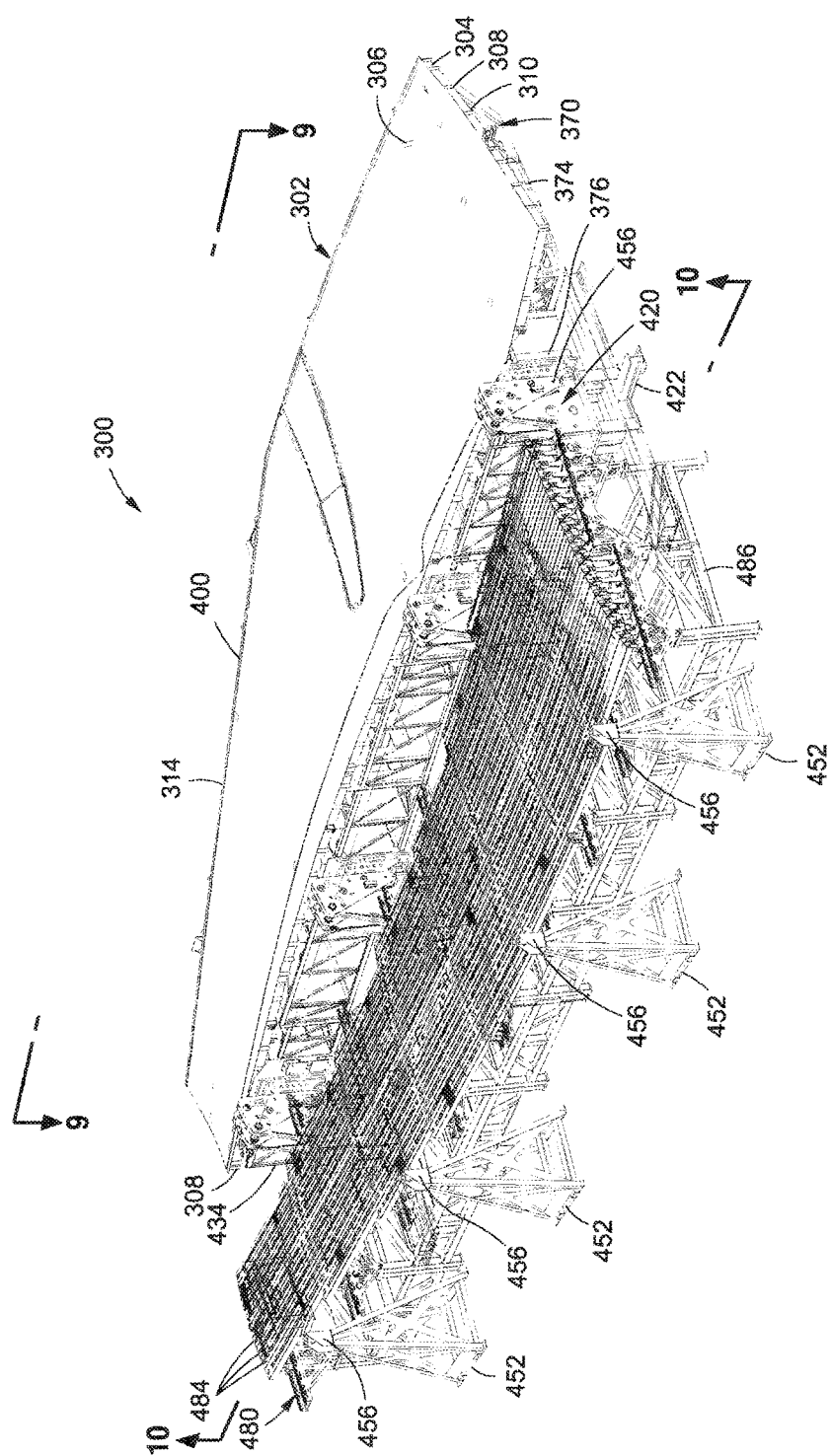
FIG. 8 is a perspective view of an example of a system for manufacturing a stiffened composite skin panel including a caul plate releasably coupled to a strongback rotatable between an open position and a closed position for mating a composite skin with a plurality of composite stiffeners.

FIG. 8 is a perspective view of an example of a system 300 for manufacturing a stiffened composite skin panel 150. In the example shown, the system 300 is shown in an open position 400 and includes a caul plate 302 upon which the composite skin 152 may be laid up. The caul plate 302 may be releasably coupled to a strongback 370. The strongback 370 may be mounted to one or more hinges 420. The hinges 420 may facilitate rotation of the strongback and caul plate between an open position 400 and a closed position 402 for mating the composite skin 152 with a plurality of composite stiffeners 200 that may be individually laid up on stiffener tooling 482 to form a stiffener tooling assembly 480. As indicated above, the stiffener tooling assembly 480 may be supported on a bond cart 486 which may comprise a truss structure supported on a surface such as a shop floor. The system 300 may include one or more posts 452 positioned around a perimeter of the stiffener tooling assembly 480. One or more of the posts 452 may include a linear actuator 456 for supporting the mass the strongback 370 and for vertically lowering the caul plate 302 into docking engagement with the stiffener tooling 482, and vertically raising (e.g., undocking) the caul plate 302 off of the stiffener tooling assembly 480 after curing of the stiffened composite skin panel 150.

Figure 9:
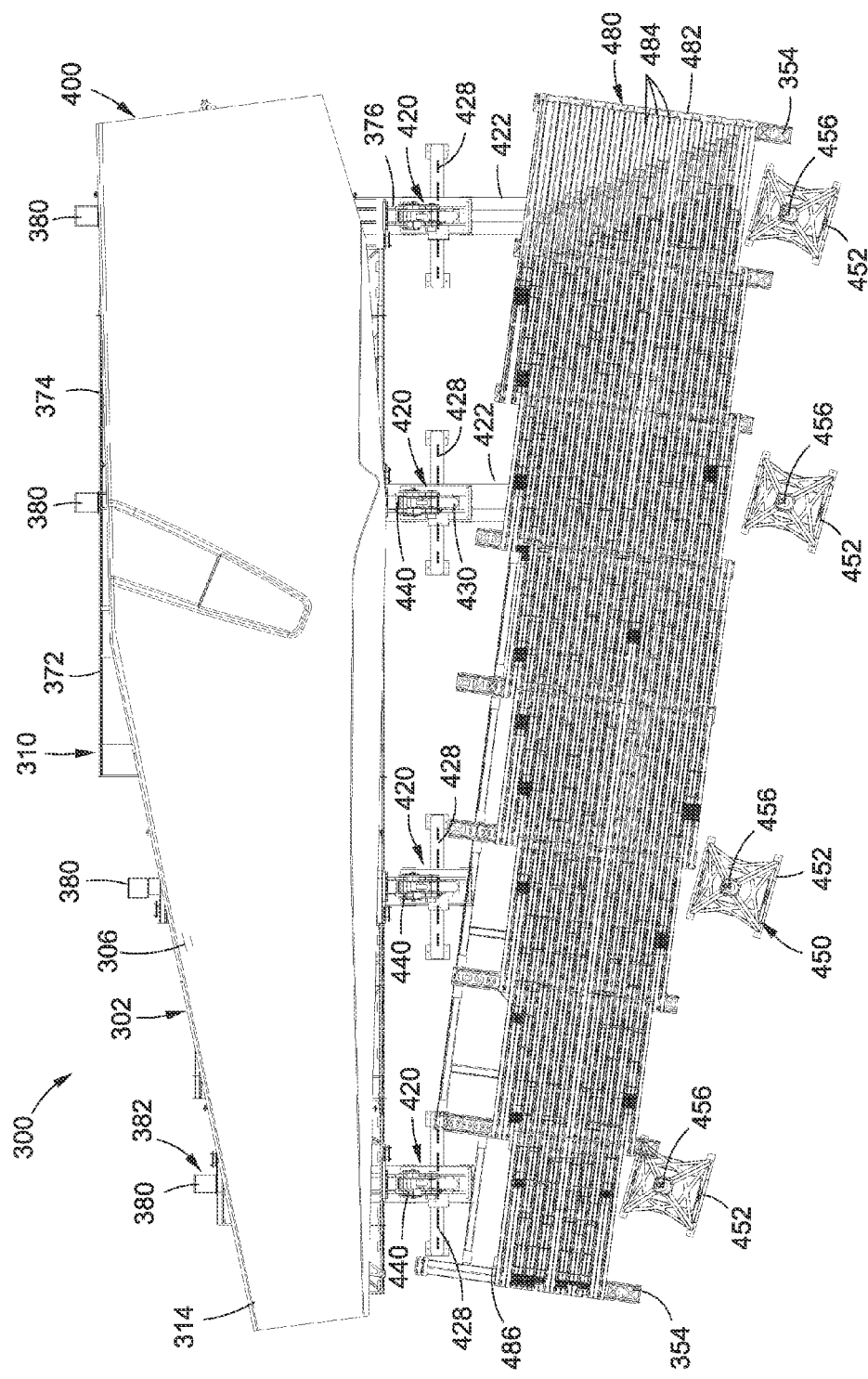
FIG. 9 is a top view of the system of FIG. 8.

FIG. 9 is a top view of the system 300 of FIG. 8 showing a set of four (4) hinges 420 attached to the strongback 370. Each one of the hinges 420 may include a fixed hinge portion 430 having a hinge base 422 that may be fixedly mounted to a fixed object 424 such as a shop floor or other non-movable surface or object. As indicated above, each one of the hinges 420 may include a movable hinge portion 440 coupled to a fixed hinge portion 430 by a hinge pin 426 defining a hinge axis 428. The hinge axes 428 of the hinges 420 may be aligned with one another (e.g., collinear).

Figure 10:
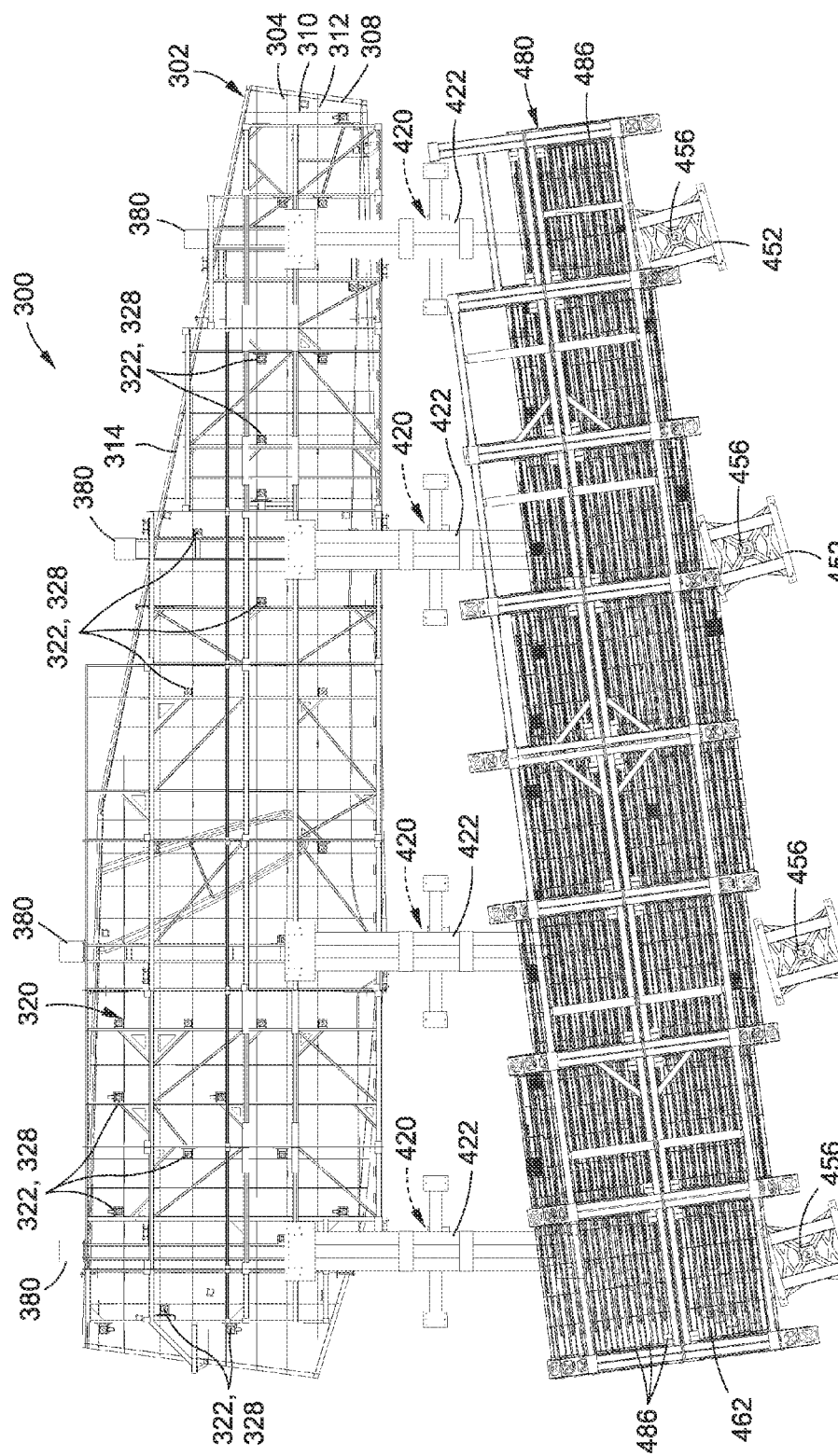
FIG. 10 is a bottom view of the system of FIG. 8.

FIG. 10 is a bottom view of the system 300 of FIG. 8. The hinge base 422 may include one or more legs extending laterally outwardly from the fixed hinge portion 430 to support the mass of the strongback 370 during rotation between the open position 400 and the closed position 402. Also shown in FIG. 10 are one or more indexing mechanisms 320 that may be incorporated into the strongback 370 and caul plate 302. In the example shown, an indexing mechanism 320 may comprise a discrete engagement point or attachment point between the caul plate 302 and the strongback 370. The indexing mechanisms 320 may be distributed along a spanwise direction 154 and/or a chordwise direction 156 of the strongback 370 for indexing or aligning the strongback 370 with the caul plate 302. In addition, the indexing mechanisms 320 may function as load-bearing points for uniformly supporting the mass of the caul plate 302 on the strongback 370 in the open position 400 such as during layup of composite plies 162 to form a composite skin 152.

Figure 11:
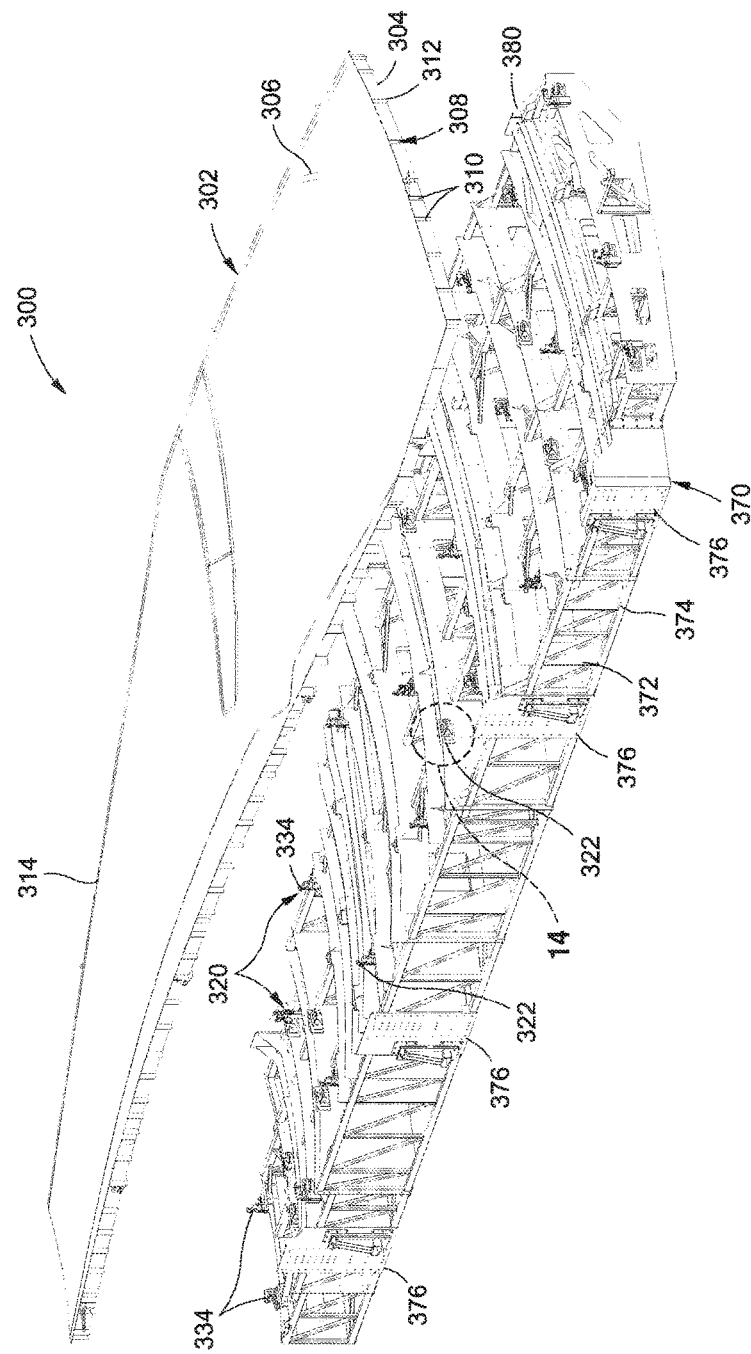
FIG. 11 is an exploded view of the caul plate and the strongback.

FIG. 11 is an exploded view of the caul plate 302 and the strongback 370. As indicated above, the caul plate 302 may be constructed as a relatively lightweight structure. For example, the strongback 370 may be constructed as a relatively stiff frame or truss structure 372 configured to support the caul plate 302 during layup of the composite skin 152 and during rotation of the caul plate 302 between the open position 400 and closed position 402. As indicated above, the system 300 may incorporate one or more indexing mechanisms 320 for releasably coupling the strongback 370 to caul plate 302.

Figure 12:
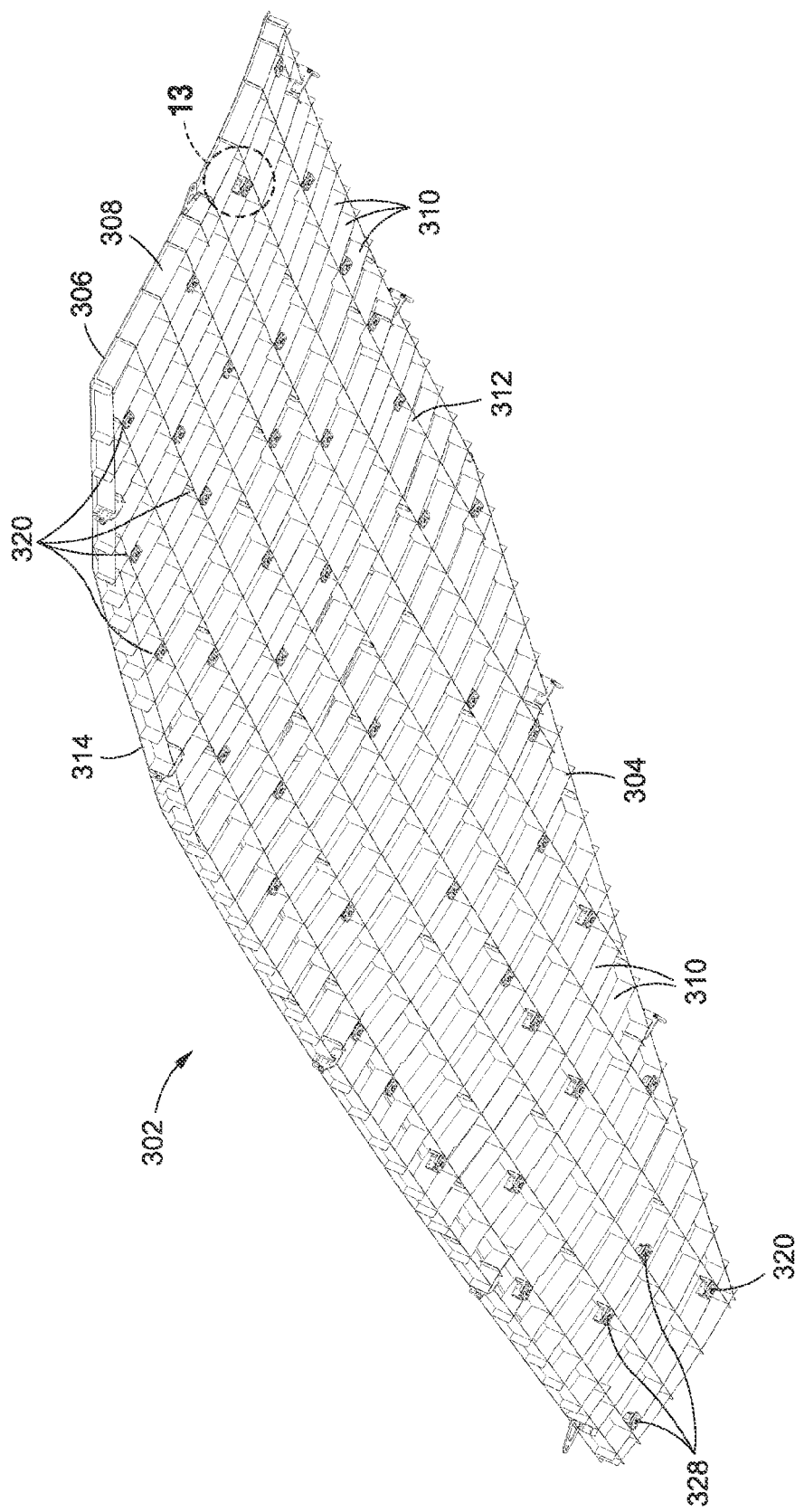
FIG. 12 is a perspective view of a backside of the caul plate showing a framework for supporting a layup surface of the caul plate.

FIG. 12 is a perspective view of the caul plate 302 showing the backside 304. In the example shown, the caul plate 302 may be formed as a grid or framework 308 of interconnected ribs 310 and/or bulkheads 312 extending along a chordwise direction 156 and/or a spanwise direction 154. The framework 308 of ribs 310 and bulkheads 312 may form a backing structure to support a face sheet defining the layup surface 306 of the caul plate 302. To reduce the weight of the caul plate 302, the ribs 310 and/or the bulkheads 312 be formed as composite ribs 310 and/or composite bulkheads 312. Forming the caul plate 302 as a composite structure instead of a conventional metallic structure such as Invar may significantly reduce the structural mass and thermal mass of the caul plate 302. However, any portion of the caul plate 302 may be formed of metallic material, or a combination of metallic material and composite material.

As indicated above, when the caul plate 302 is attached to the strongback 370, the caul plate 302 may be globally stiff (e.g., along the spanwise direction 154 and/or along the chordwise direction 156) to maintain the intended contour of the outer mold line 160 of the layup surface 306 of the caul plate 302. However, when detached from the strongback 370, the caul plate 302 may be locally compliant in an out-of-plane direction to accommodate spanwise differential changes in laminate thickness 164 during debulking of the composite skin 152 and/or during co-curing or co-bonding of the composite skin 152 to the composite stiffeners 200.

Figure 13:
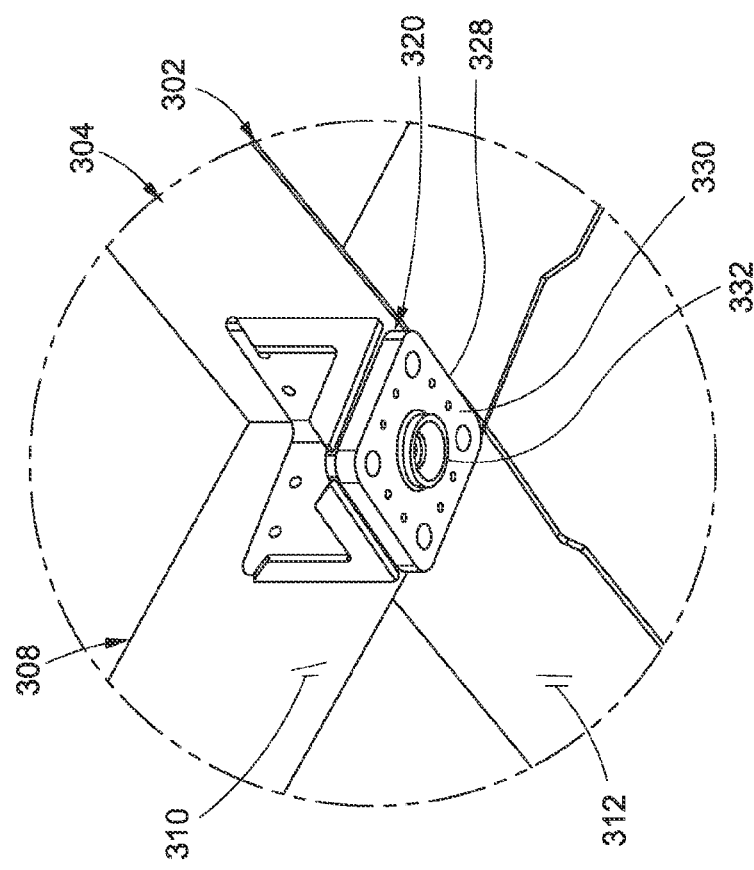
FIG. 13 is a perspective view of an example of a socket fixture mounted to the caul plate as part of an indexing mechanism for indexing or aligning the caul plate to the strongback.

FIG. 13 is a perspective view of an example a socket fixture 328 of an indexing mechanism 320 for indexing or aligning the strongback 370 with the caul plate 302. A similar arrangement may be included in embodiments wherein the strongback 370 is mated to the stiffener tooling assembly 480. In FIG. 13, the socket fixture 328 may include a socket plate 330 having a socket 332 or bore. The socket plate 330 may be mechanically fastened and/or adhesively bonded to the caul plate 302 such as to one or more of the vertically oriented ribs 310 and/or bulkheads 312 of the caul plate 302. In the example shown, the socket plate 330 may be mounted to the backside 304 of the caul plate 302.

Figure 14:
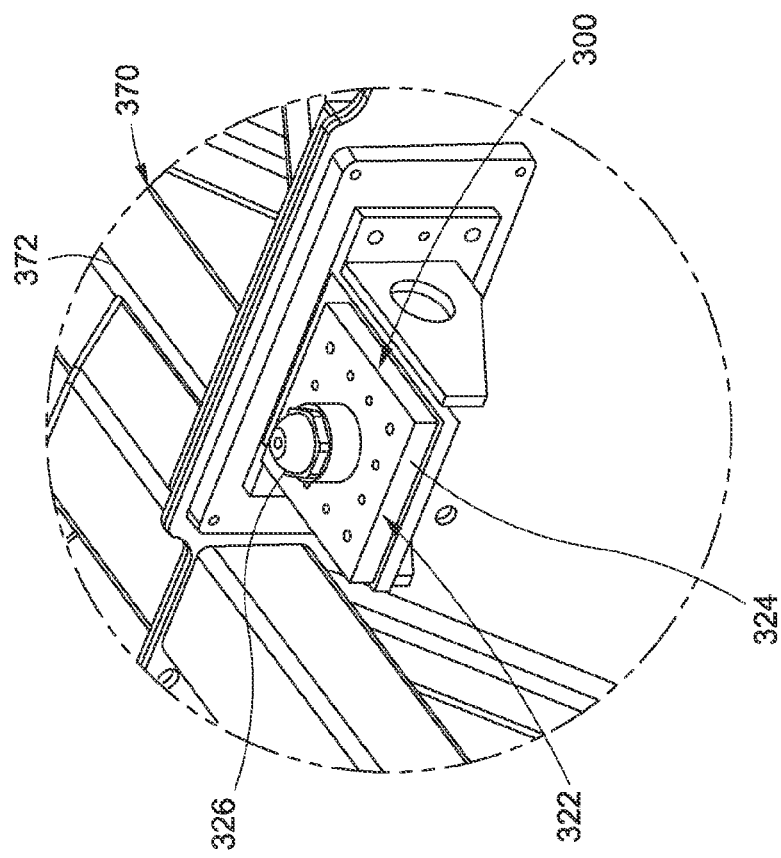
FIG. 14 is a perspective view of an example of a ball fixture mounted to the strongback.

FIG. 14 is a perspective view of an example of a ball fixture 322 mounted to the strongback 370. The ball fixture 322 includes a plate 324 having a ball 326 protruding above the plate. The ball 326 may be sized and configured to engage a socket 332 of a socket fixture 328 which may be mounted on the caul plate 302. A plurality of ball fixtures 322 and socket fixtures 328 may be respectively mounted on the strongback 370 and caul plate 302, or vice versa. The plurality of ball fixtures 322 and socket fixtures 328 may be distributed over the spanwise direction 154 and chordwise direction 156 of the strongback 370 and caul plate 302 and may guide the caul plate 302 and strongback 370 into engagement with one another.

Figure 15:
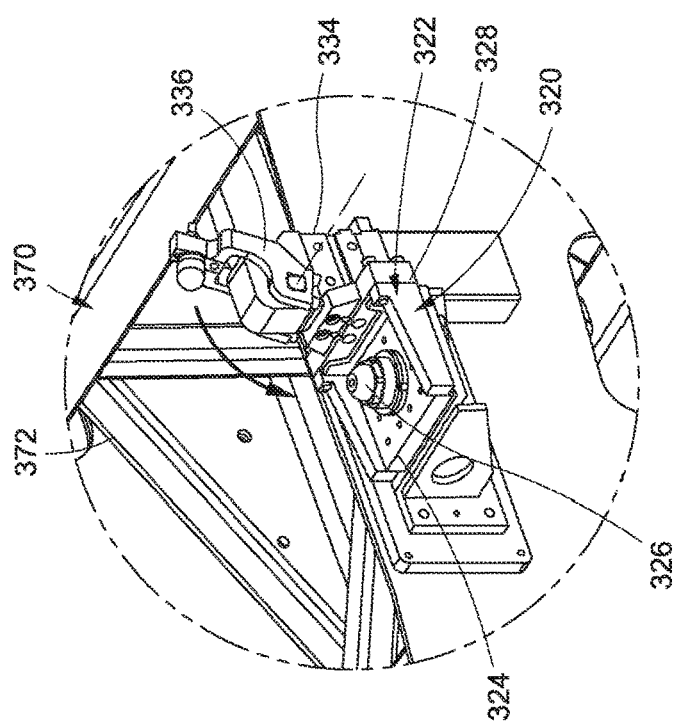
FIG. 15 is a perspective view of an example of a ball fixture incorporating a clamp for clamping the caul plate to the strongback.
Figure 37:
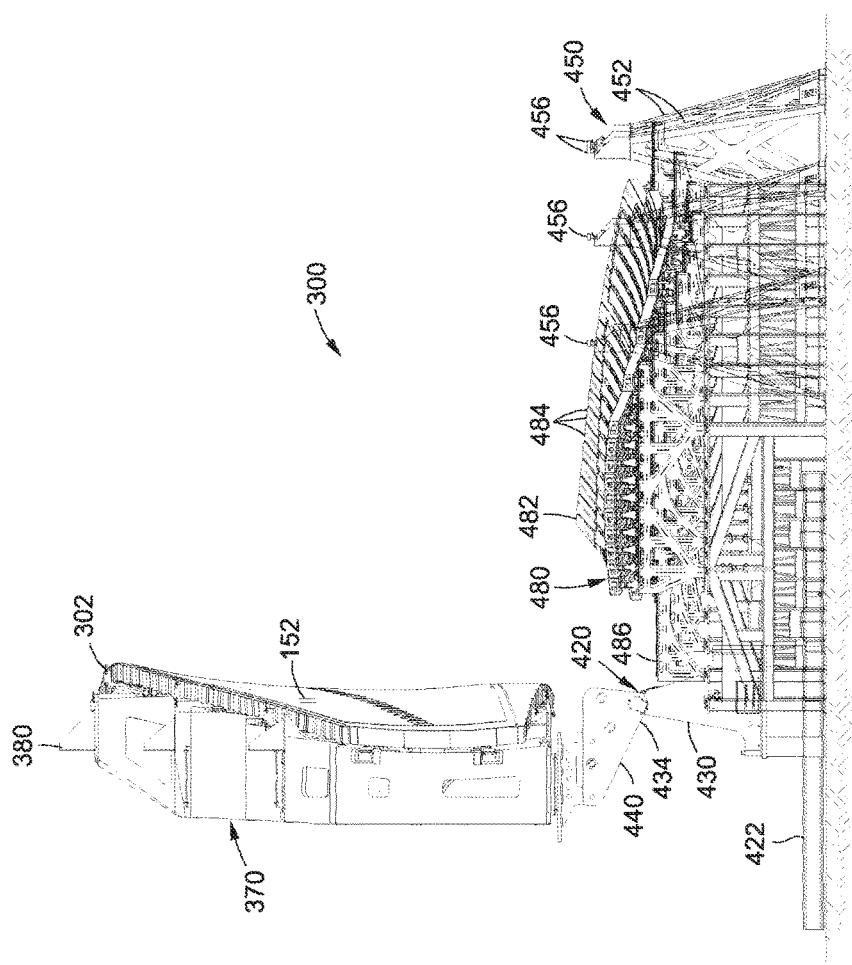
FIG. 37 is an end view of the system showing the caul plate and the strongback during rotation from the open position toward the closed position with the stiffener tooling assembly.

FIG. 15 is a perspective view of an example of a ball fixture 322 incorporating a clamp 334 for clamping the caul plate 302 to the strongback 370. Alternatively or additionally, one or more of the socket fixtures 328 may include a clamp 334 for releasably coupling the strongback 370 to the caul plate 302. The clamps 334 may be uniformly distributed along the strongback 370 for uniformly supporting the mass of the caul plate 302 when the caul plate 302 is suspended from or supported by the strongback 370 such as during rotation of the strongback and caul plate into the closed position 402 or hover position 404 (FIG. 37).

Figure 16:
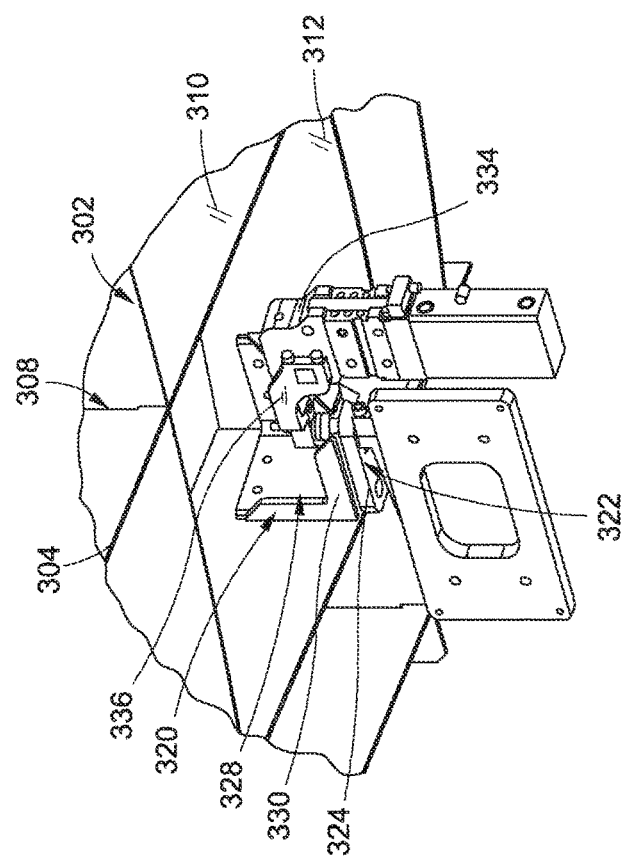
FIG. 16 is a perspective view of the caul plate clamped to the strongback.

FIG. 16 is a perspective view of the caul plate 302 clamped to the strongback 370. One or more of the clamps 334 may be integrated into one or more of the socket fixture 328 and/or ball fixtures 322. Each clamp may include a clamp arm 336 configured to engage an underside of the plate 324, 330 of the respective ball fixture 322 and/or socket fixture 328. In the example shown, the clamp arm 336 may be pneumatically actuated although other means may be implemented for actuating the clamps 334 including, but not limited to, hydraulic actuation, electromechanical actuation, or other means.

Figure 17:
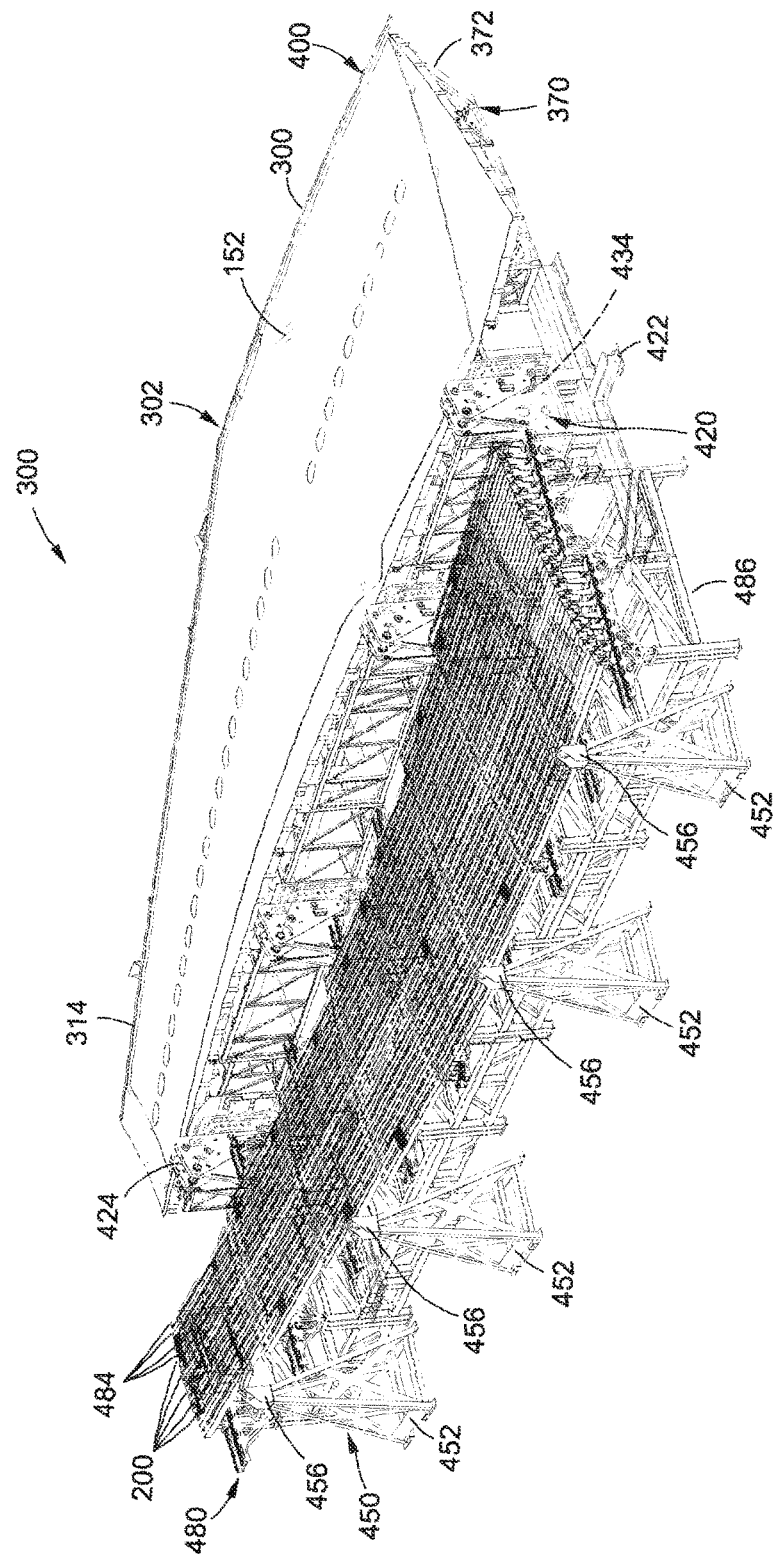
FIG. 17 is a perspective view of the caul plate and the stiffener tooling assembly in the open position and wherein the caul plate is supporting a composite skin and the stiffener tooling assembly is supporting a plurality of composite stiffeners.

FIG. 17 is a perspective view of the caul plate 302 and the stiffener tooling assembly 480 in the open position 400. The caul plate 302 is shown supporting a composite skin 152. The composite stiffeners 200 may be separately laid up on stiffener tooling 482 such as when the stiffener tooling assembly 480 is in the open position 400.

Figure 18:
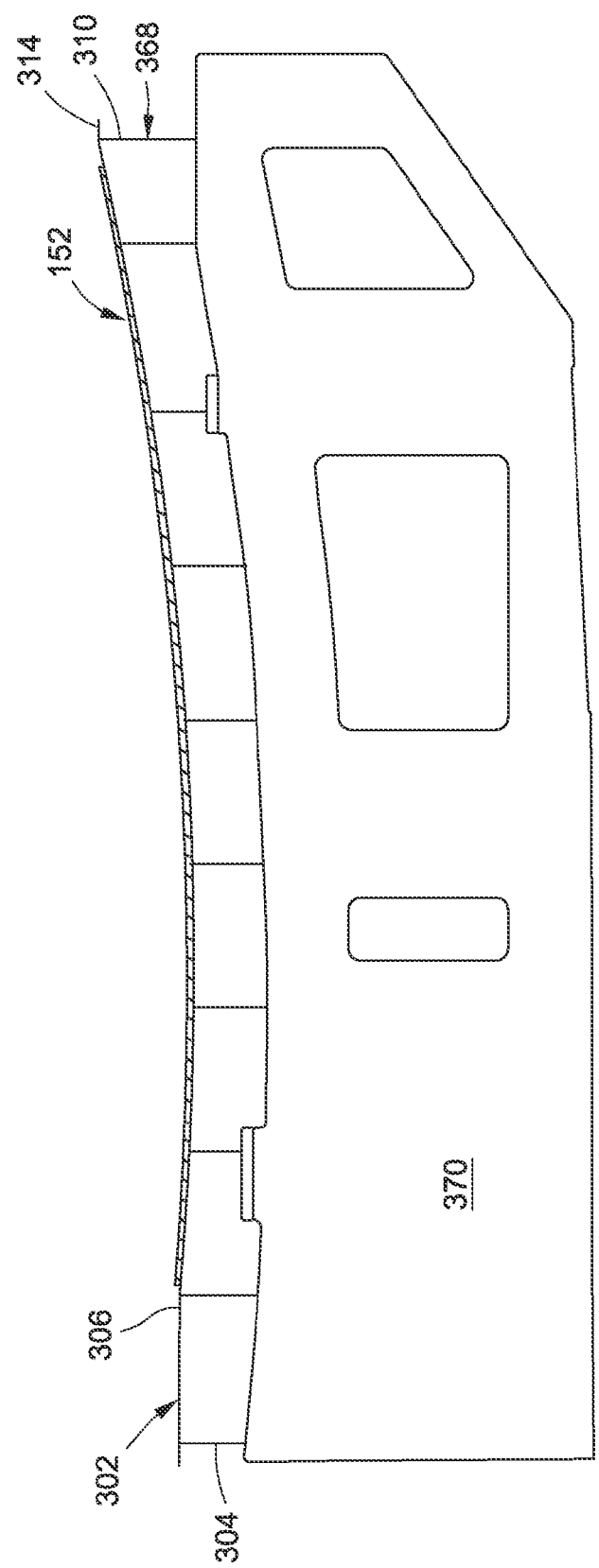
FIG. 18 is a sectional view of an example of caul plate supported on a strongback.

FIG. 18 is a sectional view of an example of caul plate 302 supported on a strongback 370. The composite skin 152 may be formed by laying up a plurality of composite plies 162 in a predetermined ply stacking sequence (not shown) on the layup surface 306 of the caul plate 302. The strongback 370 may provide a stiff supporting structure to prevent deformation of the contour of the layup surface 306 during the layup process.

Figure 19:
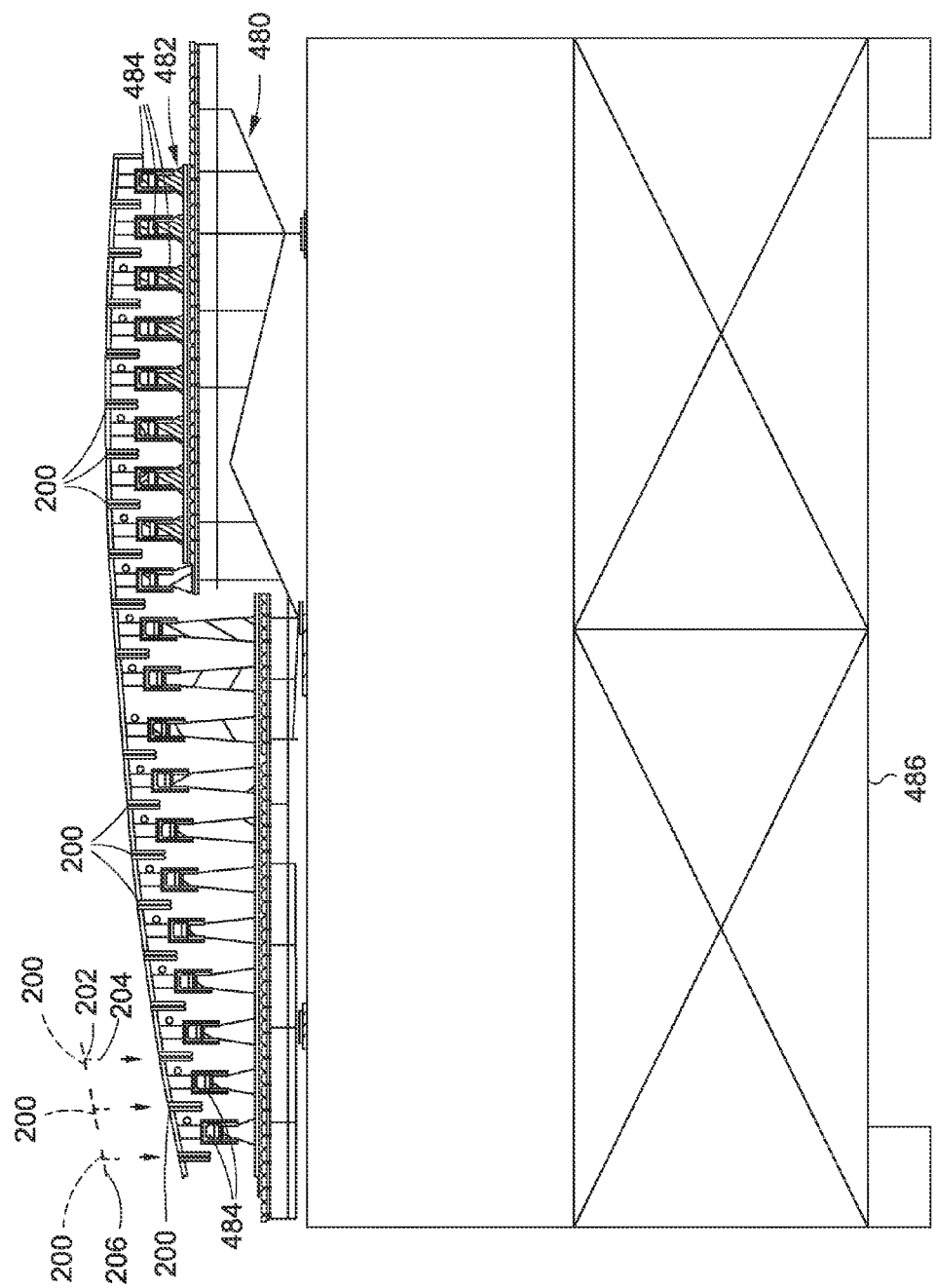
FIG. 19 is a sectional view of an example of a stiffener tooling assembly supported on a bond cart.

FIG. 19 is a sectional view of an example of a stiffener tooling assembly 480 supported on a bond cart 486 (diagrammatically represented). The stiffener tooling 482 may comprise a plurality of stiffener form blocks 484. In an embodiment, uncured composite plies 162 may be laid up on individual stiffener form blocks 484 to form one or more L-shaped composite elements as shown in FIG. 7. In one example not shown, each one of the stiffener form blocks 484 may be configured to form a pair of L-shaped composite elements each having a web 204 and a flange 206. After forming the composite plies 162 into L-shaped composite elements on the stiffener form blocks 484, the stiffener form blocks 484 may be assembled in parallel, side-by-side arrangement such that the webs 204 of adjacent L-shaped composite elements are in contact with one another. When the form blocks 484 are assembled, the flanges 206 of the composite stiffeners 200 may collectively form a contour that matches the contour of the inner mold line 158 of the composite skin 152 to be mated to the flanges 206. As indicated above, although the composite stiffeners are shown as blade sections 202 formed as back-to-back L-shaped composite elements, the composite stiffeners 200 may be provided in any one of a variety of different cross-sectional configurations (e.g., hat section, C-section, I-section, etc.) By assembling any one of a different variety of configurations of composite elements.

Figure 20:
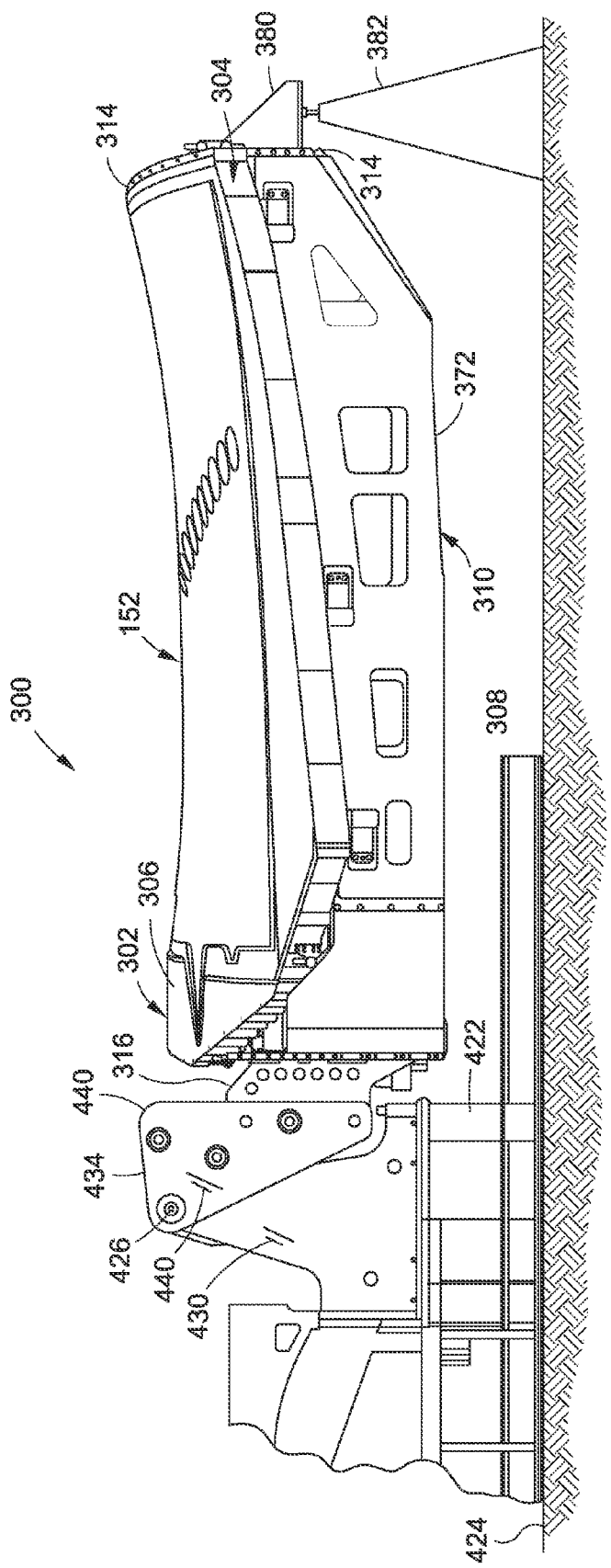
FIG. 20 is an end view of the caul plate supported on the strongback coupled to a hinge.

FIG. 20 is an end view of the caul plate 302 supported on the strongback 370 which is coupled to a hinge 420. One side of the strongback 370 may be supported by one or more hinges 420. An opposite side of the strongback 370 may be supported by one or more jack stands 382 or other support structure supporting the strongback support fittings 380. As indicated above, each hinge 420 may have a hinge base 422, a fixed hinge portion 430, and a movable hinge portion 440. The fixed hinge portion 430 may extend upwardly from the hinge base 422. The fixed hinge portion 430 may include one or more vertically oriented fixed hinge plates 432. In one example, each one of the fixed hinge plates 432 may support a hinge pin 426. The movable hinge portion 440 may include one or more movable hinge plates 442. The hinge 420 may further include at least one hinge pin 426 coupling the fixed hinge plates 432 coupled to the movable hinge plates 442 by one or more of the hinge pins 426. In the example shown, each hinge 420 may include a pair of parallel fixed hinge plates 432 extending vertically upwardly from the hinge base 422. In addition, each fixed hinge plate 432 may have an opposing pairs of movable hinge plates 442 positioned on opposite sides of the fixed hinge plate 432 and coupled to A hinge pin 426 extending through the fixed hinge plate 432. However, a hinge 420 may be provided in any configuration that provides a fixed hinge portion 430 and a movable hinge portion 440 for rotating the strongback 370.

Figure 21:
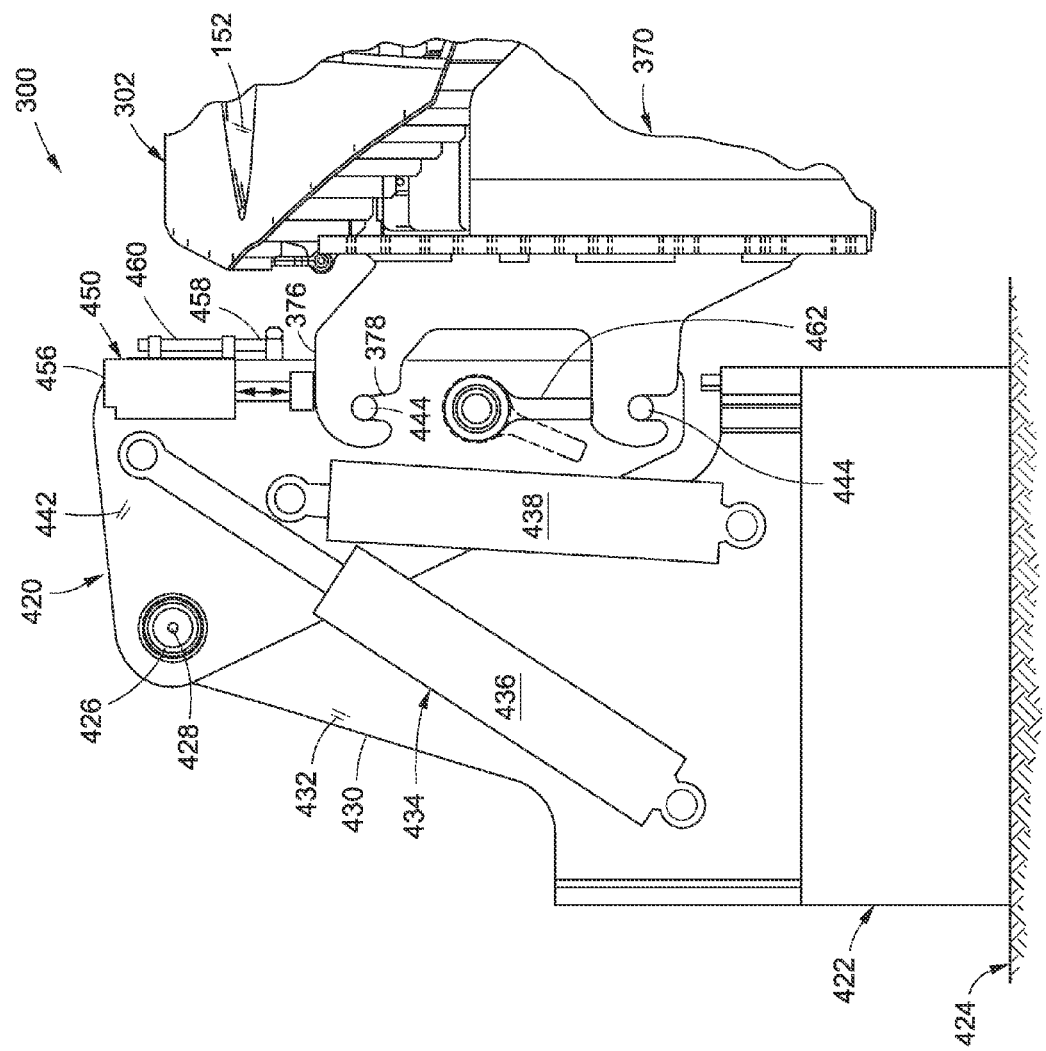
FIG. 21 is a sectional view of an example of a hinge having a pair of rotational actuators for rotating a movable hinge portion and further including a linear actuator for vertically moving the caul plate and strongback from a hover position above the stiffener tooling assembly to a docked position wherein the composite skin is in contact with the composite stiffeners.

FIG. 21 is a sectional view of an example of a hinge 420 with some of the hinge plates 432, 442 removed to illustrate the actuators 434, 436, 438, 456. The strongback 370 may be coupled to one or more of the movable hinge plates 442 using a strongback attach fitting 376. In the example shown, the strongback attach fitting 376 may include one or more mating grooves or slots 378 which may be sized and configured to engage one or more strongback mounting pins 444 that may be fixedly included with the movable hinge plates 442. The strongback attach fitting 376 may include a pair of hooks which may have slots 378 to allow for releasable coupling of the strongback 370 to the fixed hinge plates 432 such as by vertically raising or lowering the strongback 370 to respectively disengage or engage the slots 378 with the strongback mounting pins 444. To maintain the strongback attach fitting 376 in engagement with the strongback mounting pins 444 during rotation when the strongback attach fitting 376 is inverted, the hinge 420 may include one or more mechanical stops 458 to prevent sliding motion of the strongback attach fitting 376 relative to the strongback mounting pins 444. In the example shown, a mechanical stop 458 may be configured as a lever 462 that may be rotatably mounted to one or more of the movable hinge plates 442. The lever 462 may have a terminal end that may be rotated into a locked position such that the terminal end bears against at least one of the hooks to prevent movement of the strongback attach fitting 376 relative to the strongback mounting pins 444.

In FIG. 21, the hinge 420 may include a pair of rotational actuators 434 for rotating the movable hinge portion 440 and the strongback 370 and caul plate 302 that may be coupled to the strongback 370. The hinge 420 may also include a linear actuator 456 for controlling gravity-induced vertical movement of the caul plate 302 and strongback 370 after the lever 462 is rotated into an unlocked position such that the terminal end of the lever 462 is no longer contacting the strongback attach fitting 376. The linear actuator 456 may allow for gravity-induced vertical motion of the strongback 370 caul plate 302 from a hover position 404 (FIG. 39) above the stiffener tooling assembly 480 to a docked position 406 (FIG. 40). In the docked position 406, the composite skin 152 may be in contact with the composite stiffeners 200 which may be supported on the stiffener tooling 482. The rotational actuators 434 and/or linear actuators 456 may be configured as hydraulic cylinders 464. In one example, one or more of the hinges 420 may include a pair of rotational actuators 434 such as a first rotational actuator 436 and a second rotational actuator 438.

In the example of FIG. 21, the rotational actuators 434 (e.g., the first and second rotational actuators 436, 438) may be positioned between the fixed hinge plates 432 and the movable hinge plates 442. However, the rotational actuators 434 may be mounted on one or both exteriors sides of the hinge 420. In the example shown, a lower end of the first rotational actuator 436 and a lower end of the second rotational actuator 438 may be coupled to the hinge base 422. An upper end of the first rotational actuator 436 and an upper end of the second rotational actuator 438 may be pinned to one or more of the movable hinge plates 442 of the movable hinge portion 440. In the example shown, the lower end of the first and second rotational actuator 436, 438 may be coupled to the hinge base 422. The upper end of the first rotational actuator 436 may be pinned to one or more of the movable hinge plates 442 at a different location than the location where the second rotational actuator 438 is pinned to one or more of the movable hinge plates 442.

In FIG. 21, the first rotational actuator 436 and the second rotational actuator 438 may each be configured as a dual-acting hydraulic cylinders in the sense that each actuator may have the capability for alternately applying a pushing force and a pulling force to assist in rotating the strongback 370 about the hinge axis 428. For example, during rotation of the strongback 370 from the open position 400 toward the closed position 402, the first and second rotational actuator 436, 438 may each be extended to apply a pushing force to rotatably urge the movable hinge plates 442 upwardly. At the point where the axis of each one the first rotational actuator 436 and second rotational actuator 438 separately (e.g., at different times) crosses over the hinge axis 428, the first and second rotational actuator 436, 438 may at different times separately start contracting and applying a pushing force to resist the contraction urged by the gravity-induced downward motion of the strongback 370. In this regard, the first and second rotational actuator 436, 438 may be configured to maintain a substantially constant rate of rotation of the strongback 370.

Figure 22:
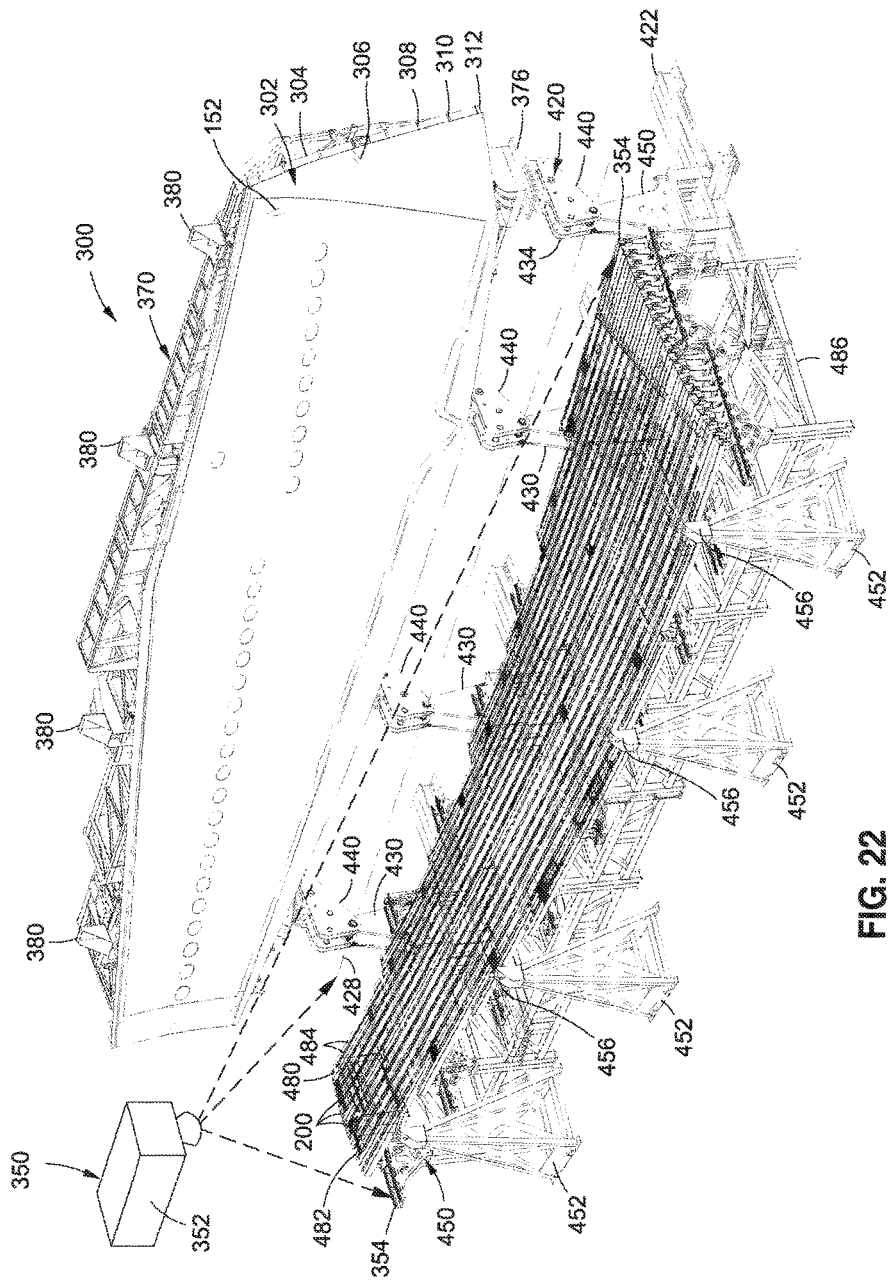
FIG. 22 is a perspective view of the system showing the caul plate and strongback during rotation from an open position toward the closed position and further illustrating an alignment system for aligning the caul plate with the stiffener tooling assembly.

FIG. 22 is a perspective view of the system 300 showing the caul plate 302 and strongback 370 at a halfway point during the rotation from the open position 400 (FIG. 17) toward the closed position 402 (FIG. 22). In the example shown, the system 300 may include at least one alignment mechanism 350 configured to align the caul plate 302 to the stiffener tooling assembly 480 as the two components are moved into docking engagement with one another. In an embodiment, an alignment mechanism 350 may comprise a computer aided metrology (CAM) device such as a vision system and/or a laser measurement device 352 configured to detect misalignment of the composite skin 152 with the composite stiffeners 200 as the composite skin 152 is moved into contact with the composite stiffeners 200 during lowering of the strongback 370 and caul plate 302 onto the stiffener tooling assembly 480.

In an example, one or more laser measurement devices 352 may initially be indexed to the hinge axes 428 of the hinges 420. One or more of the laser measurement devices 352 such as a time-of-flight laser (not shown) may be mounted to surrounding structure such as a ceiling or a wall of the building or to one or more alignment fixtures (not shown) that may be erected adjacent to the stiffener tooling assembly 480 or to a floor-mounted support or stand (not shown). The alignment mechanism 350 is not limited to one or more laser measurement devices 352, and may include alignment devices of any suitable configuration for detecting the location of one or more optical tooling targets 354 that may be mounted at one or more locations around the perimeter of the stiffener tooling assembly 480.

In an embodiment, the alignment mechanism 350 (e.g., a laser measurement devices 352) may detect or measure the amount of offset or mismatch between a measured location of the optical tooling targets 354 and a desired location of the optical tooling targets 354 relative to the hinge axes 428. In this regard, the desired location of the optical tooling targets 354 may represent a condition wherein that the caul plate 302 is aligned with the stiffener tooling assembly 480. The location of the optical tooling targets 354 may be defined in terms of aircraft coordinates (e.g., station, water line, butt line) or in any other suitable reference coordinate system.

During docking of the caul plate 302 to the stiffener tooling assembly 480, one or more laser measurement devices 352 may be activated to monitor the position of the stiffener tooling assembly 480. Based upon the offset or mismatch between the measured location and desired location of the optical tooling targets 354, the x-y position of the stiffener tooling assembly 480 may be adjusted such as by using one or more portable dollies (not shown) or automated guided vehicles (not shown) until the offset or mismatch between the measured location and the desired location of each optical tooling target 354 is within a predetermined tolerance. In an example not shown, one or more of the automated guided vehicles may be positioned underneath the stiffener tooling assembly 480 and may be configured to vertically lift the stiffener tooling assembly 480 off the shop floor by an amount sufficient to allow adjustment of the x-y position of the stiffener tooling assembly 480 relative to the caul plate 302, after which the automated guided vehicles may then lower the stiffener tooling assembly 480 back into contact with the shop floor.

FIG. 23 is a perspective view of the system 300 showing the caul plate 302 and strongback 370 in the closed position 402 relative to the stiffener tooling assembly 480. As indicated above, the system 300 may include one or more posts 452 which may be positioned around the perimeter of the stiffener tooling assembly 480 such as along one or more sides of the stiffener tooling assembly 480. One or more of the posts 452 may include one or more linear actuators 456 for supporting the mass of the strongback 370 in the closed position 402. As indicated above, one or more of the hinges 420 may also include one or more linear actuators 456 for supporting the mass of the strongback 370 in cooperation with the linear actuators 456 of the posts 452. In the present disclosure, linear actuators 456 are linear in the sense that they control the linear or vertical motion of the strongback 370 from the hover position 404 to the docked position 406, and vice versa. The linear actuators 456 are not limited to actuators that move along a linear direction such as an actuating cylinder (e.g., a hydraulic cylinder 464), and may include alternative forms of actuators configured for moving the strongback 370 and caul plate 302 along a linear or vertical direction such as between a hover position 404 and a docked position 406. The linear actuators 456 are part of a counterbalancing system 450 configured to counterbalance or support at least a portion of the mass of the strongback 370 when the caul plate 302 is docked to the stiffener tooling assembly 480 to allow the composite skin 152 and the composite stiffeners 200 to be moved into contact with one another and avoid transmitting the mass the strongback 370 onto the mated components.

In the present disclosure, the closed position 402 may be described as a position wherein the strongback 370 and the caul plate 302 are rotated into position above the stiffener assembly tooling 480 or into engagement with the stiffener tooling assembly 480. In this regard, the closed position 402 encompasses both the hover position 404 and the docked position 406. The hover position 404 may be described as a position wherein the caul plate 302 and the composite stiffener 200 are in vertically spaced relation to one another. The docked position 406 may be described as a position wherein the caul plate 302 is engaged with the stiffener tooling assembly and/or the composite skin 152 is in contact with the composite stiffeners 200.

Figure 24:
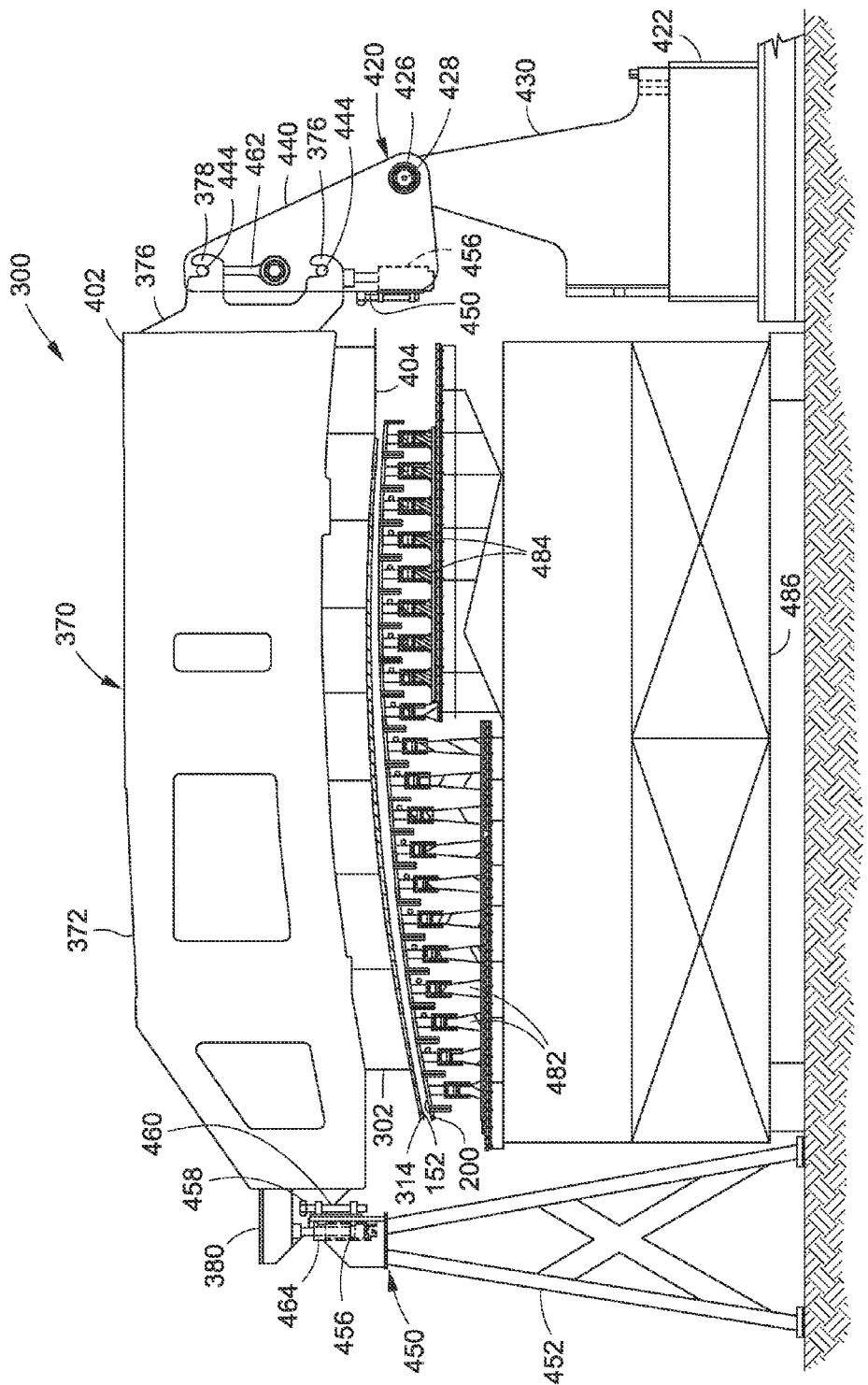
FIG. 24 is a side view of the caul plate and strongback in the closed position and illustrating a linear actuator included with each one of the hinge and the post.

FIG. 24 is a side view of the caul plate 302 and strongback 370 in the closed position 402 (e.g., docked position 406). In the example shown, the caul plate 302 is positioned above the stiffener tooling assembly 480. FIG. 24 illustrates a linear actuator 456 included with each one of the hinge 420 and the post 452. Each post 452 may be supported on the shop floor or other fixed object (not shown). Each linear actuator 456 may be mounted adjacent to or on a top of a post 452. The linear actuators 456 may extend upwardly from the posts 452 and may be configured to engage a corresponding plurality of strongback support fitting 380 that may be included with the strongback 370. For example, the strongback support fittings 376 may be mounted to a strongback perimeter 374 such as along a side of the strongback 370.

In the example shown, a post 452 mounted on a side of the stiffener tooling assembly 480 opposite each one of the hinges 420. As indicated above, the counterbalancing system 450 may prevent a substantial portion or an entirety of the strongback 370 mass from being transferred onto the composite skin 152 and the composite stiffeners 200 sandwiched between the caul plate 302 and the stiffener tooling 482. In this regard, the counterbalancing system 450 may prevent the application of excessive compaction pressure on the composite layup and the composite stiffeners 200 which may otherwise compromise the integrity of the composite layups and/or may result in damage to the caul plate 302, the stiffener tooling 482, and/or the bond cart 486.

Figure 25:
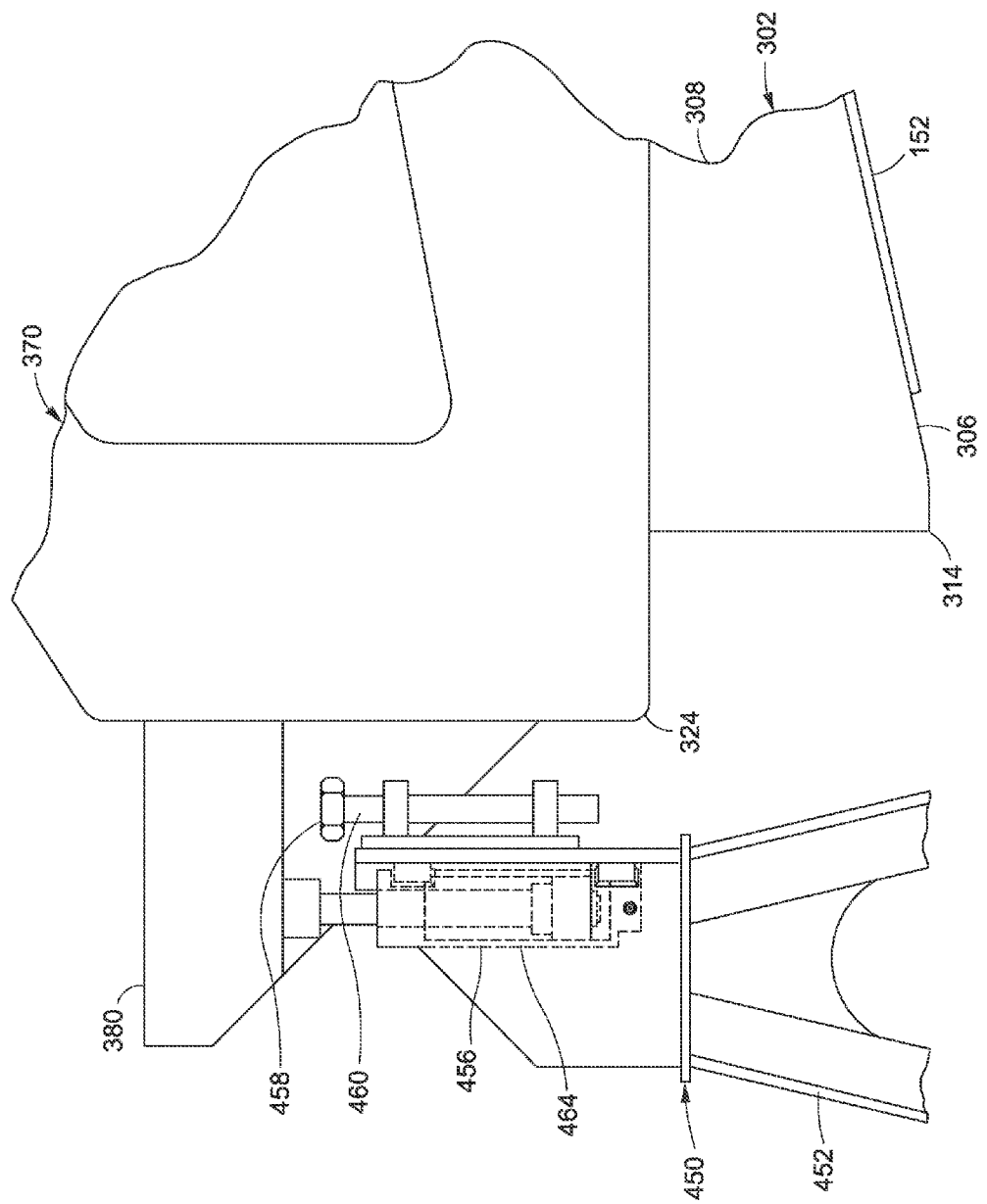
FIG. 25 is a side view of a post having a linear actuator for supporting at least a portion of the mass of the strongback in the closed position and for vertically lowering the strongback from a hover position to a docked position.

FIG. 25 is a side view of a post 452 having a linear actuator 456 for supporting at least a portion of the mass of the strongback 370 in the closed position 402 and for vertically lowering the strongback 370 from a hover position 404 to a docked position 406. The post 452 may also include a mechanical stop 458 as a fail-safe mechanism for supporting the strongback 370 in the event of a failure of one or more of the linear actuators 456. In the example shown, the mechanical stop 458 may be configured as a threaded rod 460 which may be threadably engaged to the post 452. In the example shown, the threaded rod 460 may include a top end configured to engage the strongback support fitting 380 to prevent the mass of the strongback 370 from being transmitted to the caul plate 302.

Figure 26:
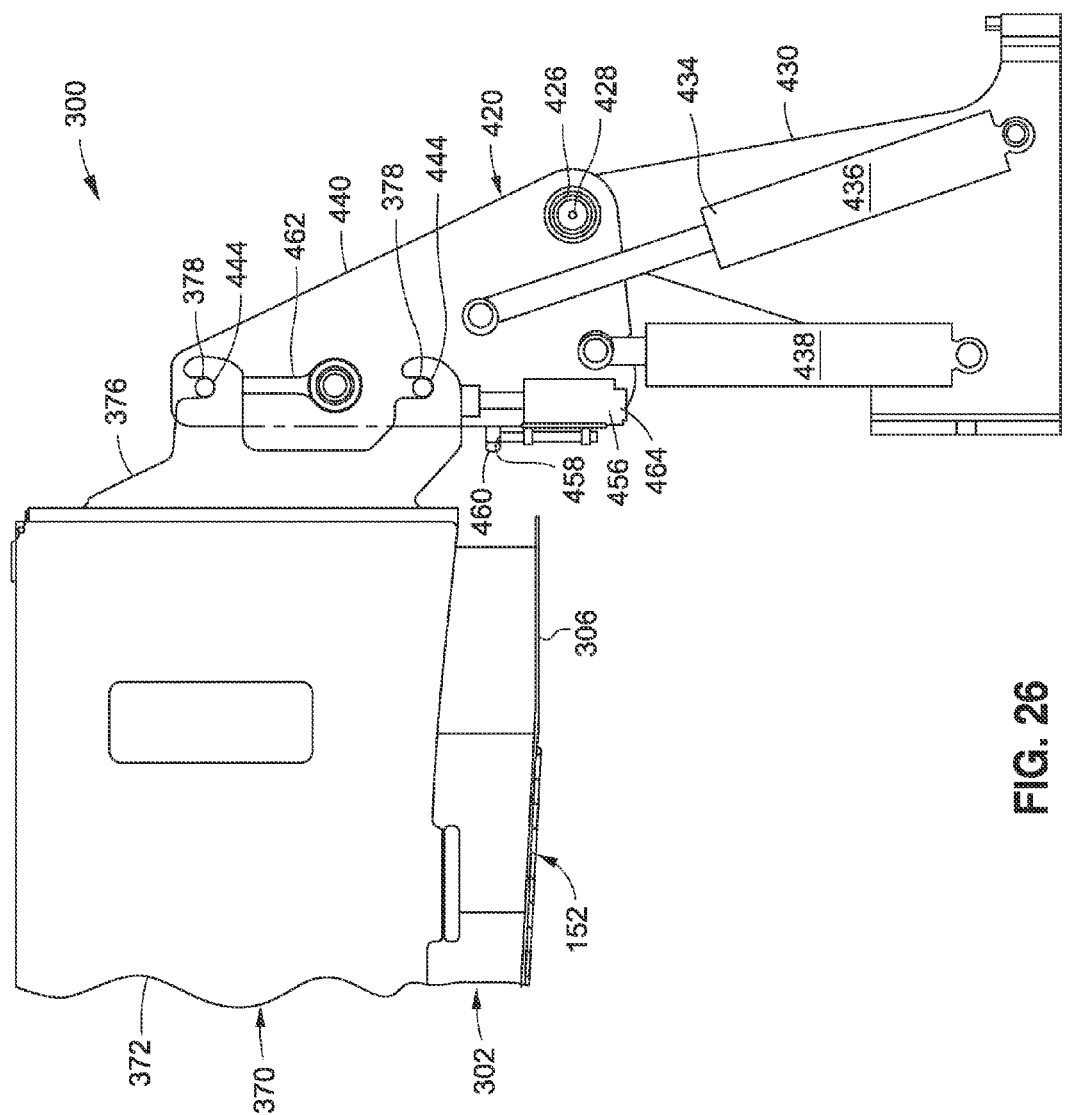
FIG. 26 is a side view of a hinge showing a first rotational actuator and a second rotational actuator for rotating a movable portion of the hinge and further illustrating a linear actuator included with the hinge for supporting and/or vertically lowering the strongback.

FIG. 26 is a side view of a hinge 442 showing the first rotational actuator 436 and second rotational actuator 438 for rotating a movable hinge portion 440 of the hinge 442. Also shown is a linear actuator 456 which may be included with the hinge for supporting and/or vertically lowering the strongback 370 from a hover position 404 to a docked position 406. In the example shown, the linear actuator 456 may be extended into engagement with the strongback attach fitting 376 to prevent vertical motion of the strongback 370 when the strongback 370 and caul plate 302 are inverted. In addition, the lever 462 may be rotated into engagement with the strongback attach fitting 376 to assist the linear actuator 456 in preventing vertical motion of the strongback 370 when inverted. The linear actuator 456 may optionally include a mechanical stop 458 (e.g., a threaded rod 460) and which may be configured to prevent vertical motion of the strongback 370 upon a failure of the linear actuator 456 when the lever 462 is rotated into an unlocked position (e.g., see FIG. 40)

Figure 27:
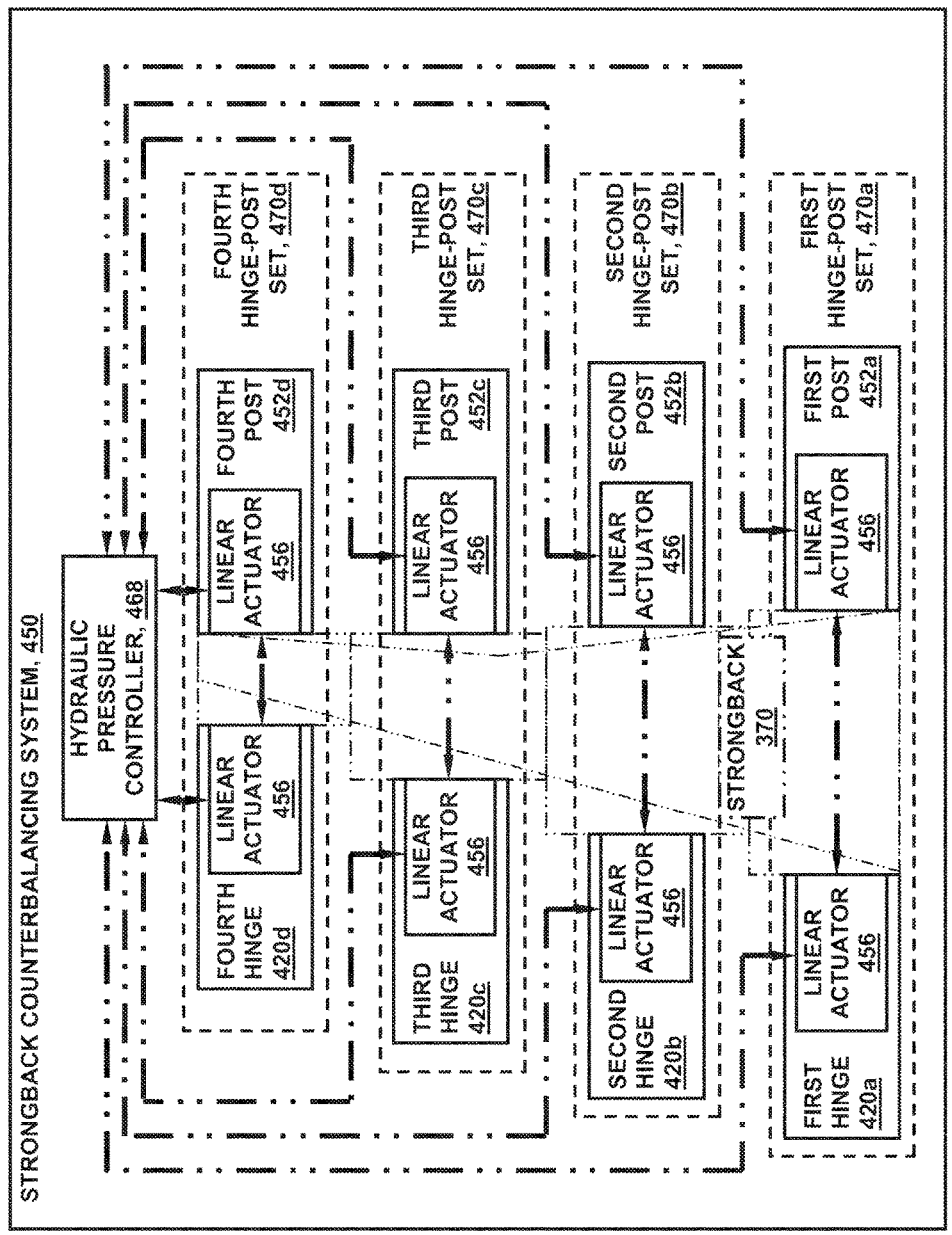
FIG. 27 is a schematic diagram of a strongback counter-balancing system including a plurality of linear actuators for supporting the mass of the strongback and vertically lowering the caul plate from a hover position to a docked position.

FIG. 27 is a schematic diagram of a strongback counterbalancing system 450 including a plurality of the linear actuators 456 for supporting the mass of the strongback 370 and vertically lowering the caul plate 302 from a hover position 404 to a docked position 406, and vice versa. In the example shown, the counterbalancing system 450 includes a hydraulic cylinder 464 (e.g., a linear actuator 456) at each one of the first, second, third, and fourth hinges 420a, 420b, 420c, 420d located on one side of the strongback 370 and a corresponding hydraulic cylinder 464 (e.g., a linear actuator 456) at each one of the first, second, third, and fourth posts 452a, 45sb, 452c, 452d positioned on an opposite side of the strongback 370 when in the closed position 402. The posts 452a, 45sb, 452c, 452d and hinges 420a, 420b, 420c, 420d may respectively form four (4) hinge-post sets including a first, second, third, and fourth hinge-post set 470a, 470b, 470c, 470d. The hydraulic cylinders 464 may be fluidly coupled (e.g., via hydraulic lines) and/or electrically connected (e.g., via electrical wiring—not shown) to a hydraulic pressure controller 468 which may be configured to regulate hydraulic pressure at each hydraulic cylinder 464.

In an embodiment, the hydraulic pressure controller 468 may regulate the hydraulic pressure at each hydraulic cylinder 464 in proportion to the local mass fraction of the strongback 370 at each hydraulic cylinder 464. For example, if the local mass fraction of the strongback 370 at the first hinge-post set 470a is analytically determined to be 25% of the total mass of the strongback 370, the hydraulic system 454 may regulate the hydraulic pressure at the hydraulic cylinder 464 at the first hinge 420a and first post 452a to support the 25% local mass fraction. The hydraulic pressure controller 468 may likewise regulate hydraulic pressure at the second, third, and fourth hinge-post sets 470b, 470c, 470d according to the local mass fraction of the strongback 370 at each one of the hinge-post sets 470b, 470c, 470d.

The hydraulic pressure controller 468 may be configured to vertically lower the caul plate 302 from a hover position 404 (FIG. 39) to a docked position 406 (FIG. 40) while the alignment mechanism 350 monitors mismatch between a current location of the optical tooling targets 354 and a desired location of the optical tooling targets 354, as described above. As indicated above, the location of the stiffener tooling assembly 480 may be adjusted using one or more dollies or automated guided vehicles (not shown) until the caul plate 302 is aligned with the stiffener tooling assembly 480 and prior to contact between the composite skin 152 and the composite stiffeners 200.

Figure 28:
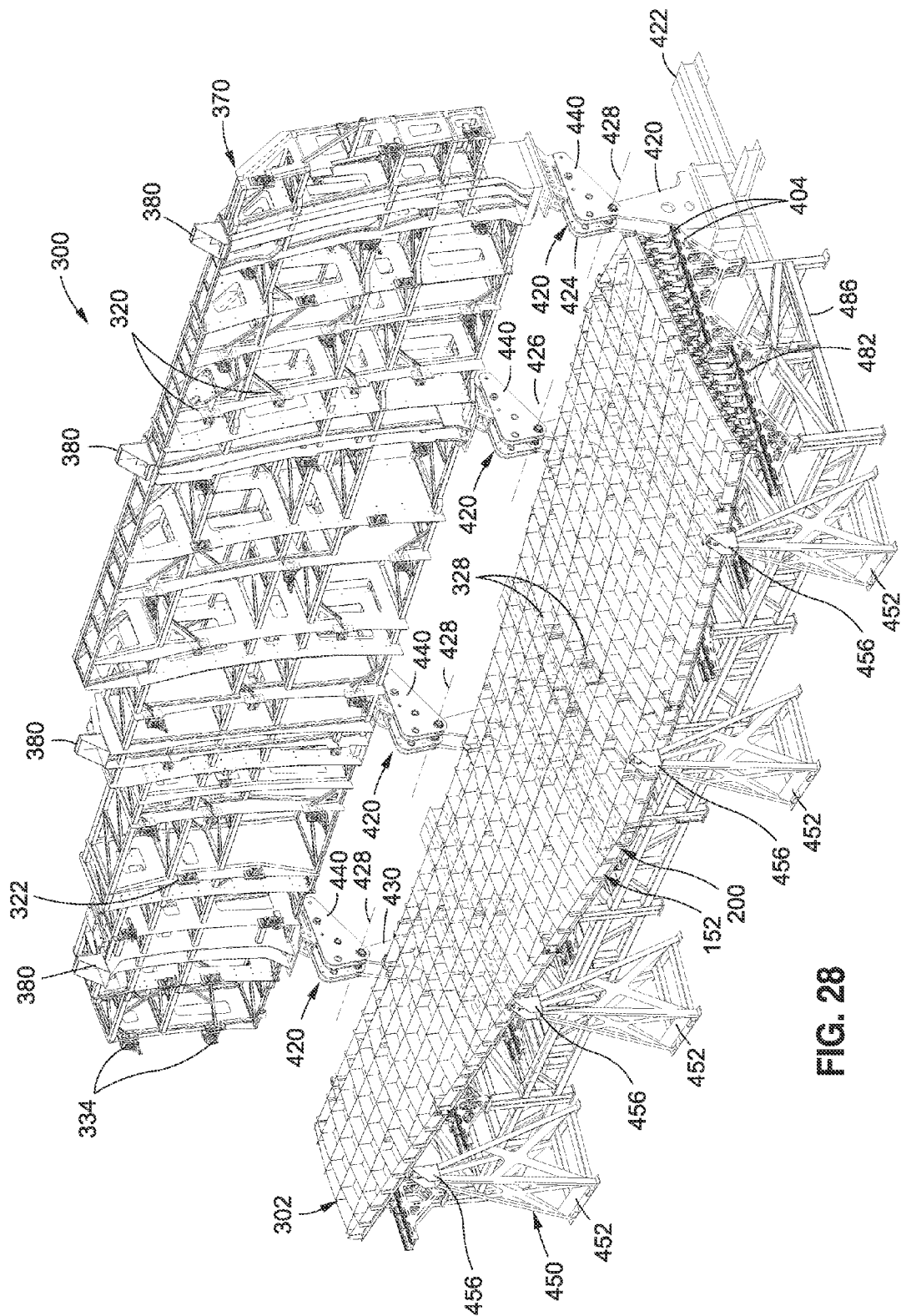
FIG. 28 is a perspective view of the system showing the rotation of the strongback from the closed position toward the open position after docking the caul plate onto the stiffener tooling assembly and decoupling the strongback from the caul plate.

FIG. 28 is a perspective view of the system 300 showing the rotation of the strongback 370 toward the open position 400 after the caul plate 302 has been docked to the stiffener tooling assembly 480 and the strongback 370 has been decoupled from the caul plate 302. As indicated above, decoupling the caul plate 302 from the strongback 370 may be effectuated by releasing the clamp arms 336 coupling the strongback 370 to the caul plate 302 as shown in FIGS. 15-16.

Figure 29:
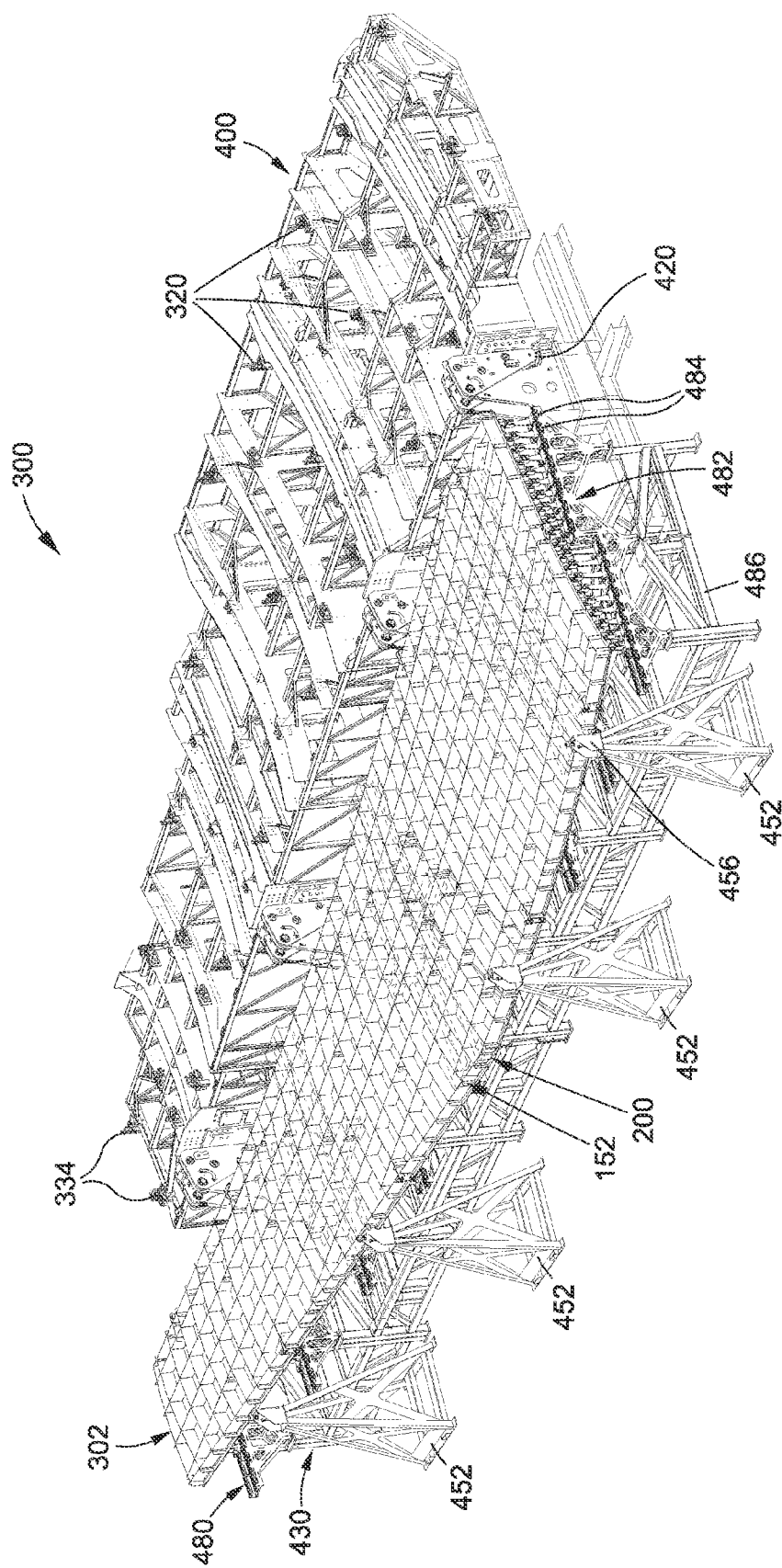
FIG. 29 is a perspective view of the strongback in the open position.

FIG. 29 is a perspective view of the strongback 370 in the open position 400. The strongback 370 may be supported by the hinges 420 on one side of the caul plate 302 and by one or more jack stands 382 (FIG. 20) on an opposite side of the caul plate 302. The caul plate 302 is shown docked to the stiffener tooling assembly 480 sandwiching the composite skin 152 and composite stiffeners 200 between the caul plate 302 layup surface 306 and the stiffener tooling 482.

Figure 30:
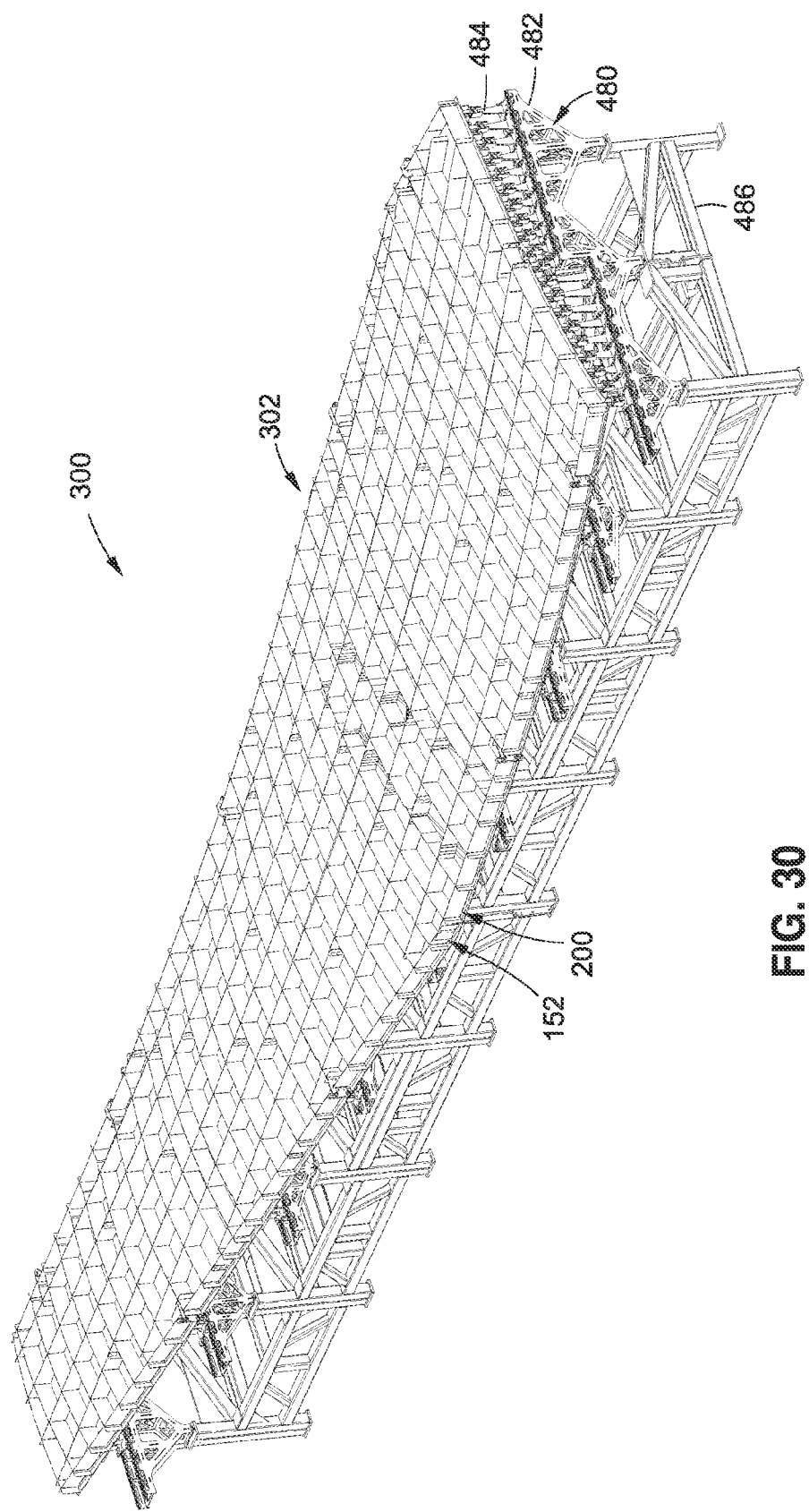
FIG. 30 is a perspective view of the caul plate docked to the stiffener tooling assembly with the strongback removed and the composite skin and composite stiffeners mated together prior to loading the assembly into an oven or autoclave for co-curing or co-bonding the composite skin to the composite stiffeners.

FIG. 30 is a perspective view of the caul plate 302 docked to the stiffener tooling assembly 480 with the strongback 370 removed. In FIG. 30, the composite skin 152 and the composite stiffeners 200 are mated together to form a composite assembly. A vacuum bag assembly (not shown) may be applied to the composite assembly in preparation for debulking, and/or co-curing or co-bonding. In this regard, the composite stiffeners 200 and the composite skin 152 may be sealed to the caul plate 302 with a bagging film (not shown). The edges of the bagging film may be sealed to the backside 304 of the caul plate 302. The composite assembly included the caul plate 302, the stiffener tooling assembly 480, and the bond cart 486 may be transferred to an oven or autoclave by engaging (e.g., lifting) the bond cart 486 with one or more dollies. Compaction pressure may be applied by drawing 114 a vacuum on the bagging film and/or applying autoclave pressure (not shown) during debulking and/or co-curing and/or co-bonding the composite skin 152 to the composite stiffeners 200.

Figure 31:
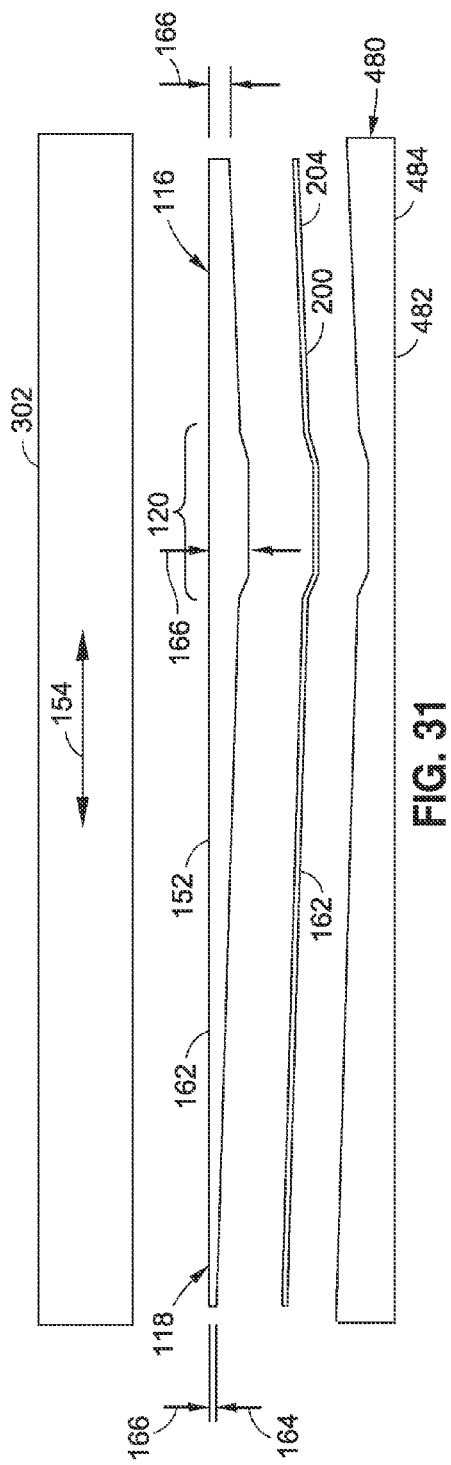
FIG. 31 is a diagrammatic exploded view of the composite assembly taken along a spanwise direction and illustrating a pre-debulk thickness of the composite skin varying along the spanwise direction.

FIG. 31 is a diagrammatic exploded sectional view of the composite assembly taken along a spanwise direction 154 and illustrating an exaggerated pre-debulk thickness 166 of a composite skin 152 varying along the spanwise direction 154. Also shown is a flange 206 of a composite stiffener 200 that may be contoured complementary to the composite skin 152. In the example shown, the composite skin 152 has a laminate thickness 164 that is greater at a root portion 116 than at the tip portion 118 of the composite skin 152. In addition, the composite skin 152 may include a nacelle portion 120 within which the laminate thickness 164 may be locally increased to support the increased load from the engine nacelles 112 supported by the wing 114 at that location. For example, a wing skin may include approximately 30 composite plies 162 at the tip portion, approximately 130 composite plies 162 at the root portion 116, and a local buildup of up to approximately 150 composite plies 162 or more at the nacelle portion 120. The spanwise variation in laminate thickness 164 may result in variations in the amount by which the laminate thickness 164 is reduced during debulking, as described in greater detail below.

Figure 32:
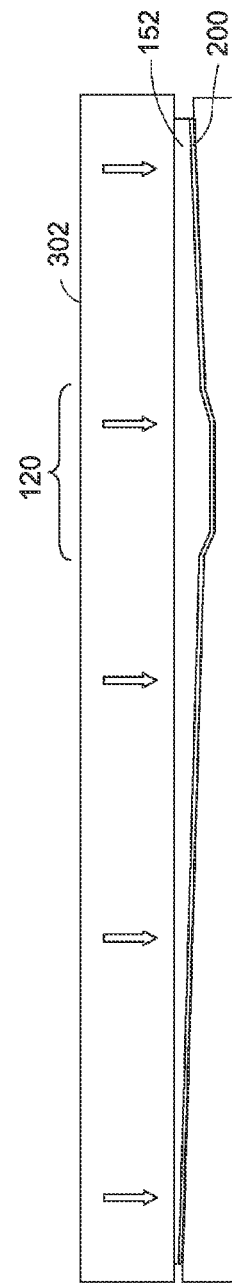
FIG. 32 is a diagrammatic view of the composite skin and composite stiffeners sandwiched between the stiffener tooling and the caul plate for applying compaction pressure to the composite skin and composite stiffeners for debulking.

FIG. 32 is a diagrammatic view of the composite skin 152 and composite stiffeners 200 sandwiched between the stiffener tooling 482 and the caul plate 302 for applying compaction pressure to the composite skin 152 and composite stiffeners 200 for debulking. As indicated above, compaction pressure may be applied by drawing 114 a vacuum on a bagging film sealing the composite assembly to the caul plate 302. Additional compaction pressure may be applied in an autoclave environment. In this regard, a compaction pressure of several atmospheres or more may be applied by the caul plate 302 onto the composite skin 152 and composite stiffeners 200 supported by the stiffener tooling 482.

Figure 33:
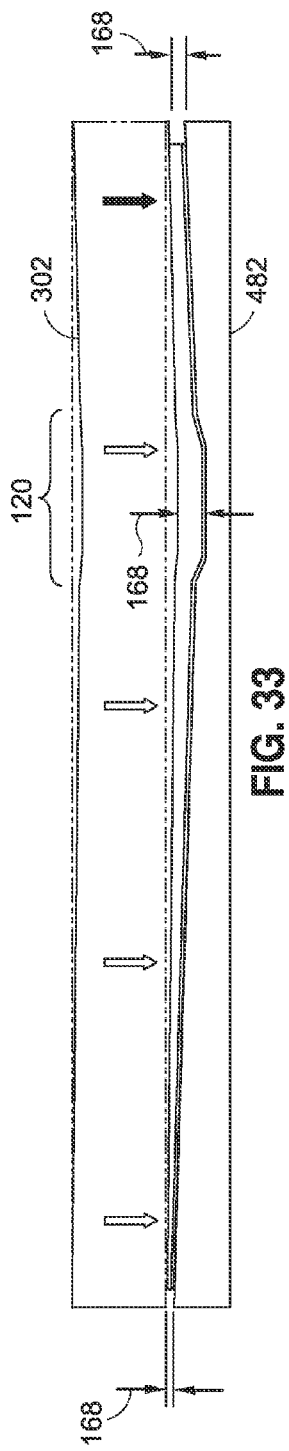
FIG. 33 is a diagrammatic view of the assembly of FIG. 31 showing the compliance (e.g., out-of-plane flexibility) of the caul plate to accommodate spanwise variations in the amount by which the laminate thickness is reduced as a result of debulking.

FIG. 33 is a diagrammatic view of the assembly of FIG. 32 showing the compliance (e.g., out-of-plane flexibility) of the caul plate 302 with the strongback 370 detached from the caul plate. For example, during the application of compaction pressure to the composite skin 152 and composite stiffeners 200, the laminate thickness 164 may be reduced by approximately 10%. Due to variations in the laminate thickness 164 along a spanwise direction 154, the caul plate 302 may advantageously be configured to be locally compliant to allow for out-of-plane flexing to accommodate the different amounts by which the laminate thickness 164 may reduce from a pre-debulk thickness 166 to a post-debulk thickness 168 during the debulking process. In addition, the caul plate 302 may be locally compliant to accommodate a reduction in laminate thickness 164 as a result of cure shrinkage that may occur during the curing of thermosetting composite plies 162.

Figure 34:
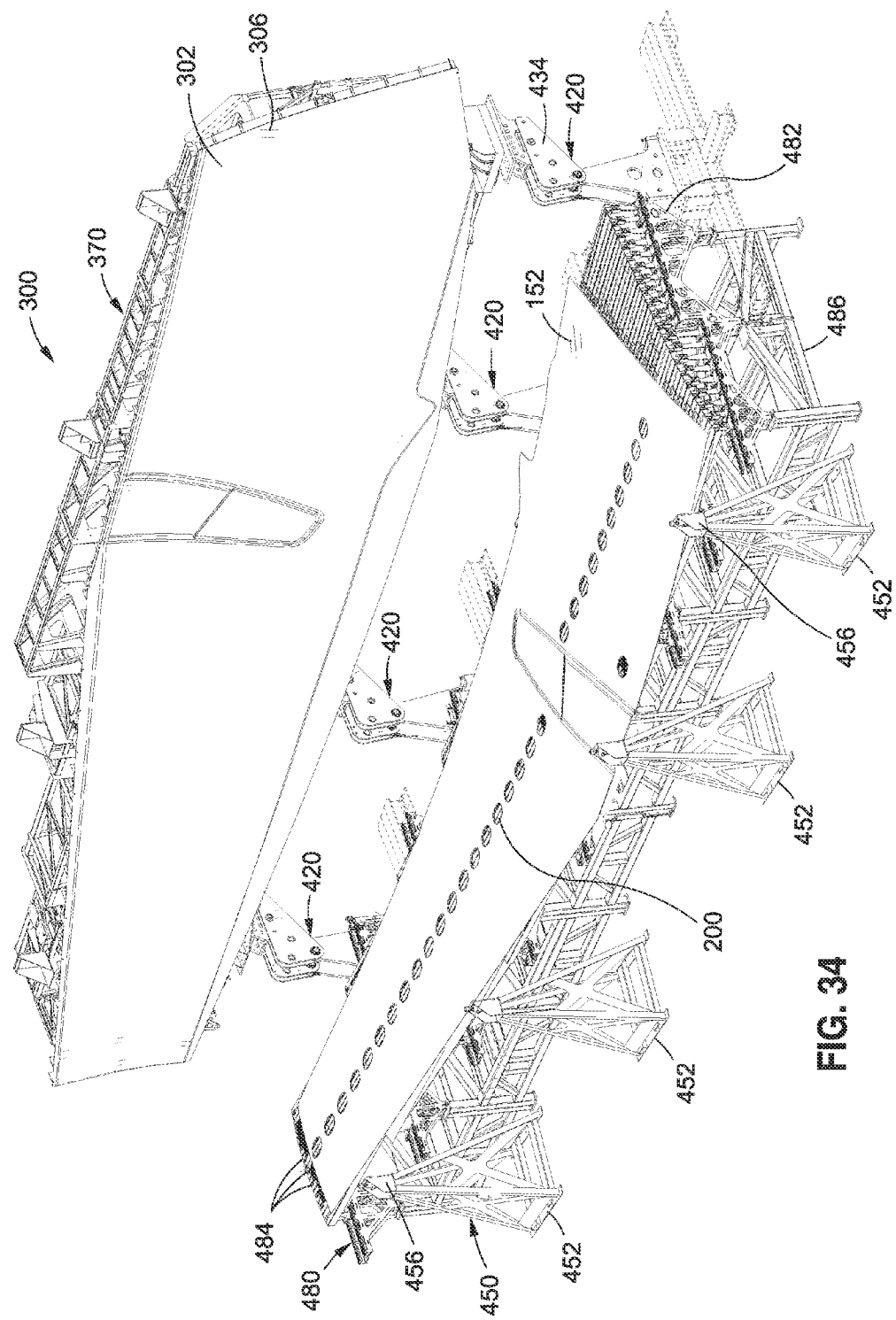
FIG. 34 is a perspective view of the system after re-attaching the strongback to the caul plate to allow for removal of the caul plate from a cured stiffened composite skin panel.

FIG. 34 is a perspective view of the system 300 after co-curing or co-bonding the composite assembly to form a stiffened composite skin panel 150. The caul plate 302 may be attached to the strongback 370 and vertically raised from the docked position 406 to the hover position 404 and then rotated from the closed position 402 to the open position 400. The cured stiffened composite skin panel 150 may be removed from the stiffener tooling 482 for post-processing such as inspection.

Figure 35:
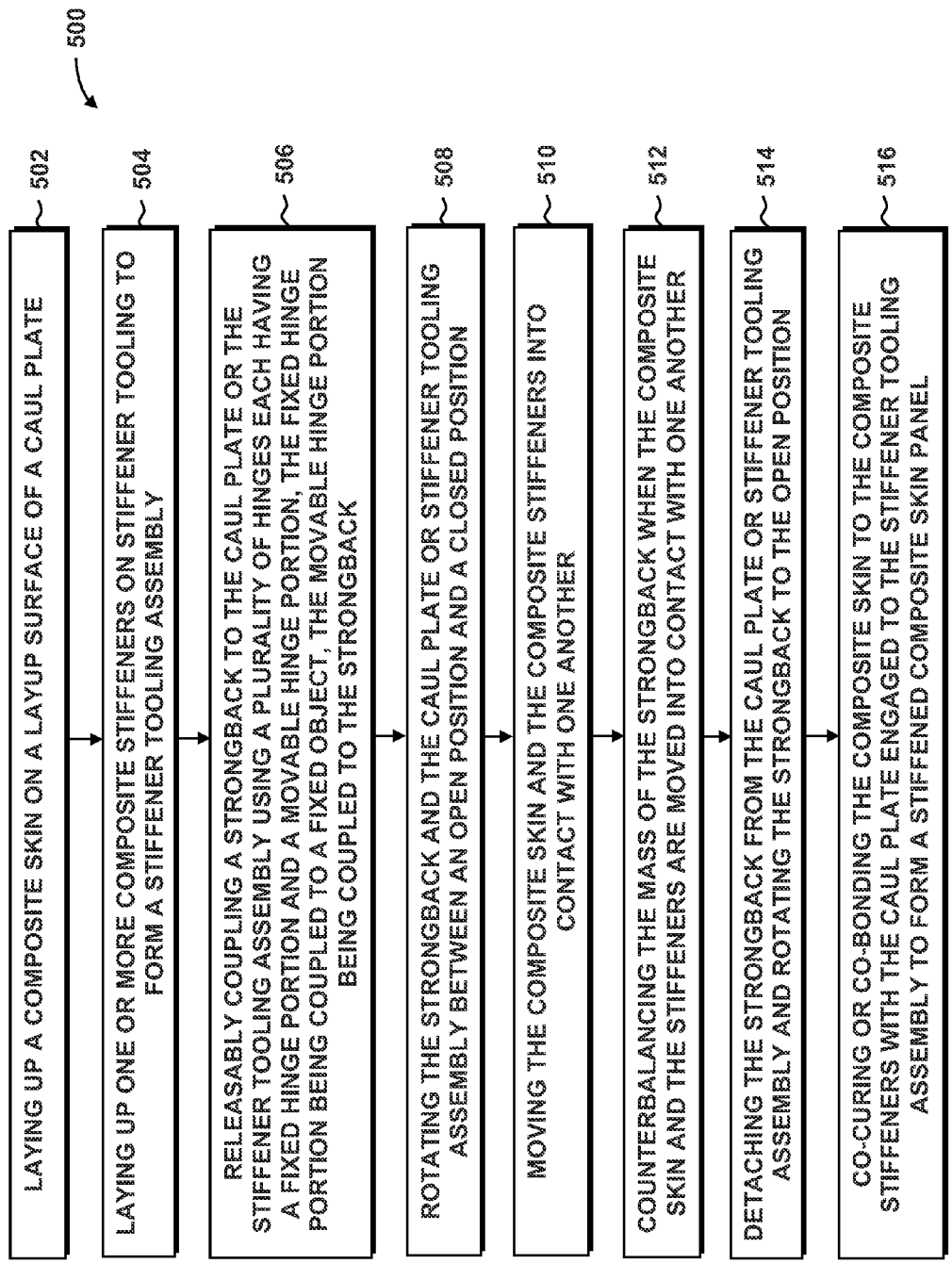
FIG. 35 is a flowchart containing one or more operations that may be included in a method of manufacturing a stiffened composite skin panel.
Figure 36:
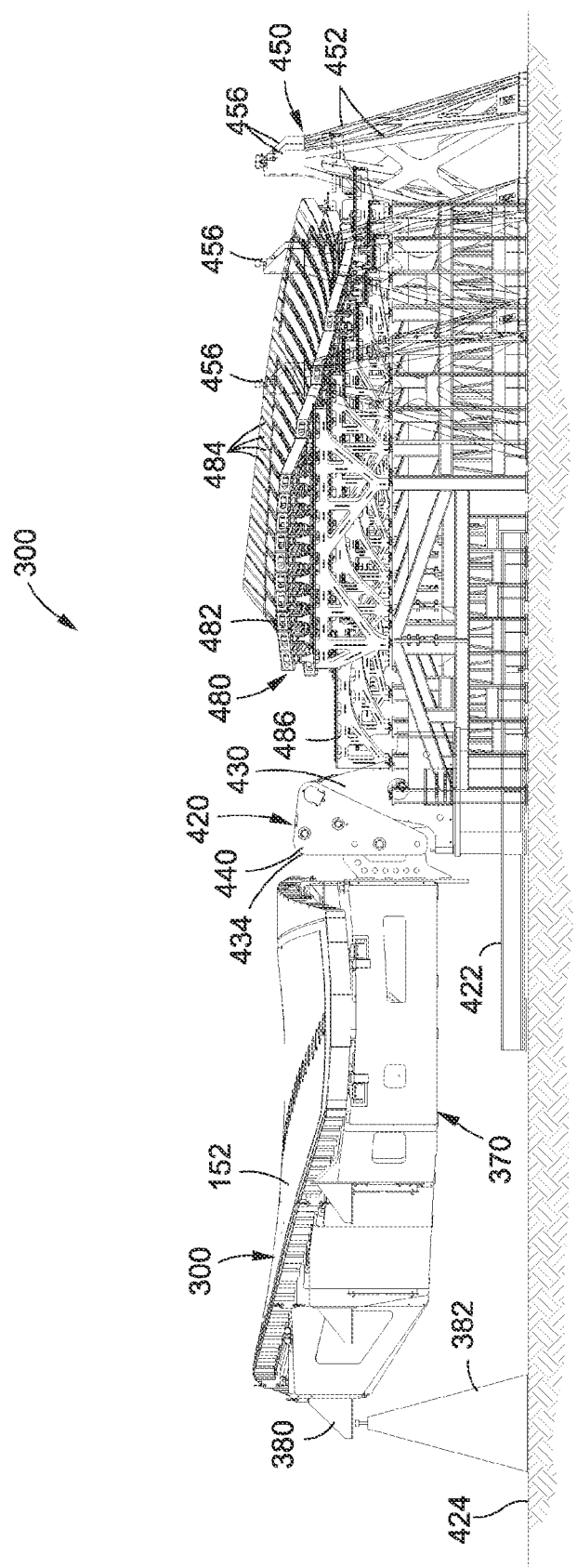
FIG. 36 is an end view of the system showing the caul plate and the stiffener tooling assembly in an open position.

FIG. 35 is a flowchart containing one or more operations that may be included in a method 500 of manufacturing a stiffened composite skin panel 150. The method may include Step 502 of providing a caul plate 302 including a layup surface 306 for supporting a composite skin 152. The method may further include laying up a plurality of composite plies 162 to form an composite skin 152 on the layup surface 306 as shown in FIG. 36. As indicated above, the composite skin 152 may be formed of uncured composite plies 162 which may then be assembled with cured or uncured composite stiffeners using the detachable strongback 370 disclosed herein as shown in FIG. 36. However, in some examples, the method may include using the strongback 370 and caul plate 302 to rotate a cured composite skin 152 onto cured or uncured composite stiffeners 200 for co-curing or co-bonding.

Step 504 of the method may include providing a stiffener tooling assembly 480 (FIG. 36) having one or more composite stiffeners 200 laid up on stiffener tooling 482. In this regard, the method may include laying up a plurality of composite plies 162 to form one or more uncured composite stiffeners 200 on the stiffener tooling 482. As indicated above, in one example, the stiffener tooling 482 may comprise a plurality of stiffener form blocks 484 each having a layup of composite plies 162. The stiffener form blocks 484 containing the uncured composite plies 162 may be arranged side-by-side to form a stiffener tooling assembly 480.

Step 506 of the method may include releasably coupling a strongback 370 to the caul plate 302 for supporting the caul plate 302 during layup of a composite skin 152 and during rotation (FIG. 37-38) of the caul plate 302 onto a stationary stiffener tooling assembly 480 using a plurality of hinges 420 as described above. However, in a further example mentioned above, instead of coupling the strongback 370 to the caul plate 302 for rotation into engagement with a stationary stiffener tooling assembly 480, the method may comprise coupling the strongback 370 to the stiffener tooling assembly 480 prior to rotation of the strongback-stiffener tooling assembly 480 into engagement with a stationary caul plate 302. As mentioned above, the method is presently described in the context of rotating the strongback 370 and caul plate 302 onto a stationary stiffener tooling assembly 480, although the structural components and the operational steps are substantially similar for each option.

The method may include releasably clamping the strongback 370 to the caul plate 302 or to the stiffener tooling assembly 480 (FIG. 36). For example, the method may include actuating one or more clamps 334 mounted to the strongback 370 for clamping the backside 304 of the caul plate 302 to the strongback 370 as shown in FIGS. 9-16. The clamps 334 (FIGS. 15-16) may include clamp arms 336 which may be pneumatically actuated and/or hydraulically actuated. For example, the clamps 334 may include pneumatic cylinders for actuating the clamp arms 336 to clamp a socket fixture 328 of the caul plate 302 to a ball fixture 322 of the strongback 370. The strongback 370 may be coupled to the caul plate 302 prior to the layup of the composite skin 152 and prior to rotation of the caul plate 302 into engagement with the stiffener tooling assembly 480.

The method may additionally include indexing, using at least one indexing and the mechanism 320 (e.g. FIGS. 13-14), the strongback 370 with the caul plate 302 or the stiffener tooling assembly 480. For example, as indicated above, the caul plate 302 may include a plurality of socket fixtures 328 (FIG. 13) for engagement with a corresponding quantity of ball fixtures 322 (FIG. 14). In this regard, the method may include engaging a ball fixture 322 to a socket fixture 328 respectively mounted to the strongback 370 and the caul plate 302, or vice versa. As indicated above, each one of the socket fixtures 328 may include a plate 330 having a socket 332 sized and configured to receive a ball 326. At least one of the ball fixtures 322 and/or socket fixtures 328 including a clamping mechanism such as a clamp 334 for releasably clamping the caul plate 302 to the strongback 370.

Figure 38:
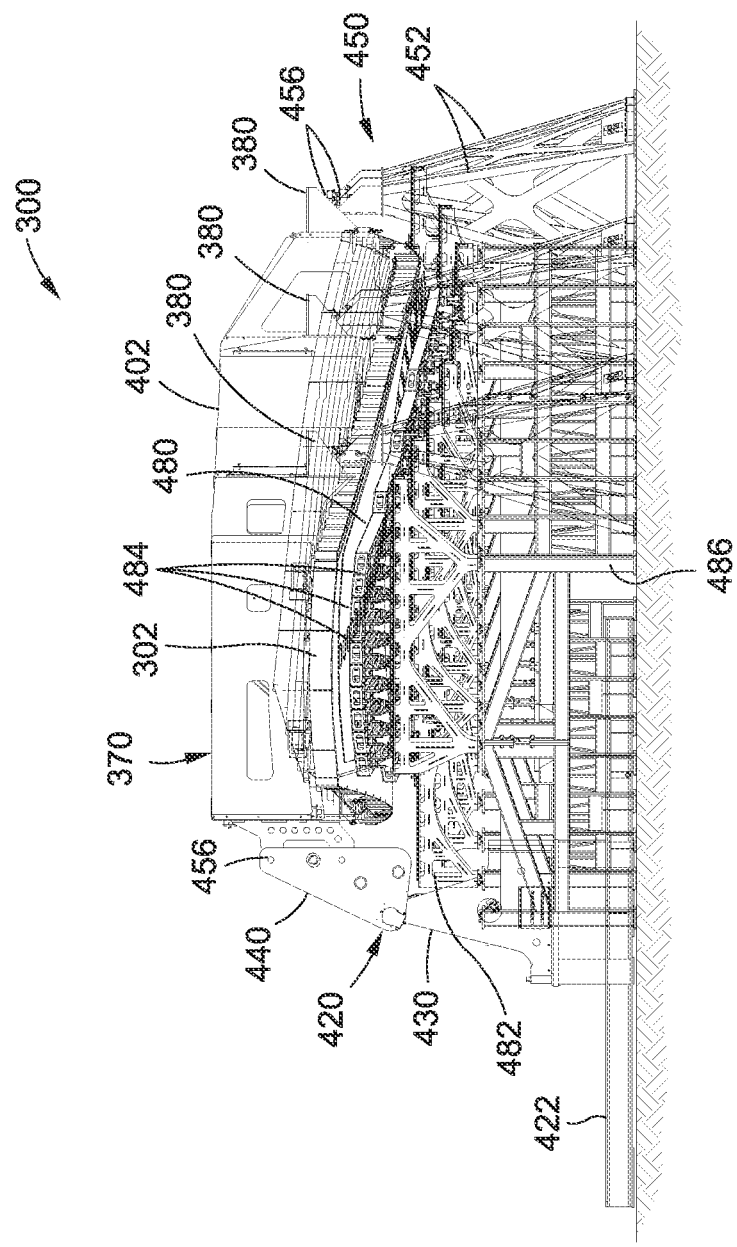
FIG. 38 is an end view of the system showing the caul plate and the strongback in a closed position (e.g., a hover position)

Step 508 of the method may include rotating the strongback 370 between an open position 400 (FIG. 36) and a closed position 402 (FIG. 38). FIG. 36 is an end view of the strongback 370 and caul plate 302 and the stiffener tooling assembly 480 in the open position 400. FIG. 37 shows the strongback 370 and caul plate oriented approximately vertically during an approximate halfway point during rotation from the open position 400 to the closed position 402 relative to the stiffener tooling assembly 480. In one example, the composite skin 152 may be retained against the layup surface 306 of the caul plate 302 by molecular adhesion and/or by mechanical means. FIG. 38 shows the caul plate 302 and the strongback 370 in the closed position 402. As indicated above, the closed position may encompass a hover position 404 of the caul plate 302 above the stiffener tooling assembly 480.

Figure 39:
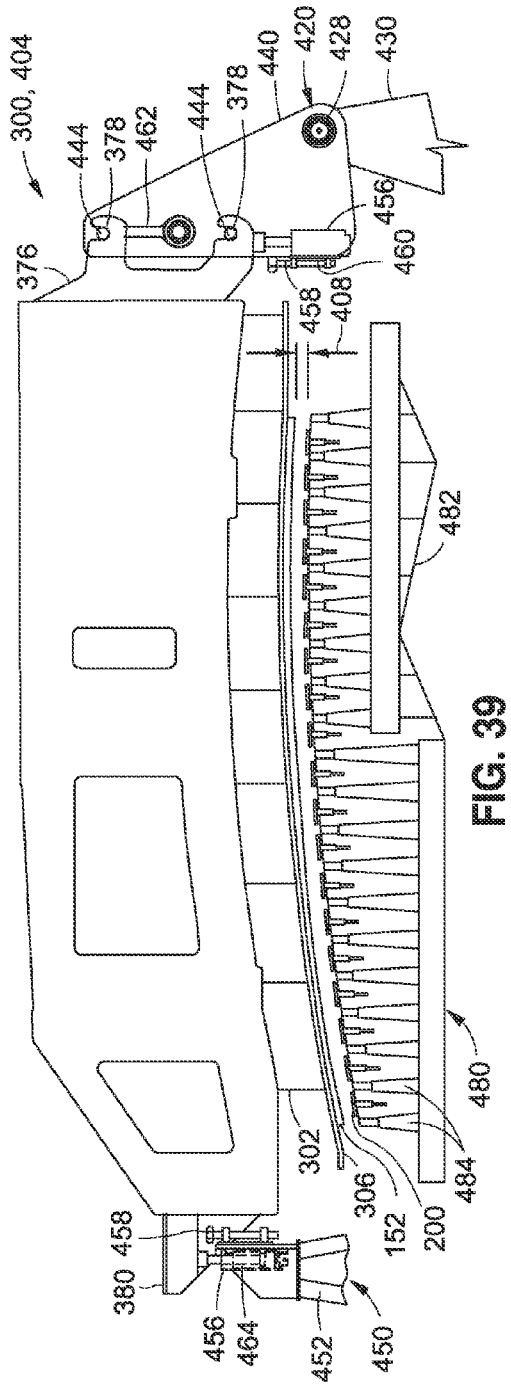
FIG. 39 is an end view of the system showing the strongback and the caul plate in a hover position above the stiffener tooling assembly.
Figure 40:
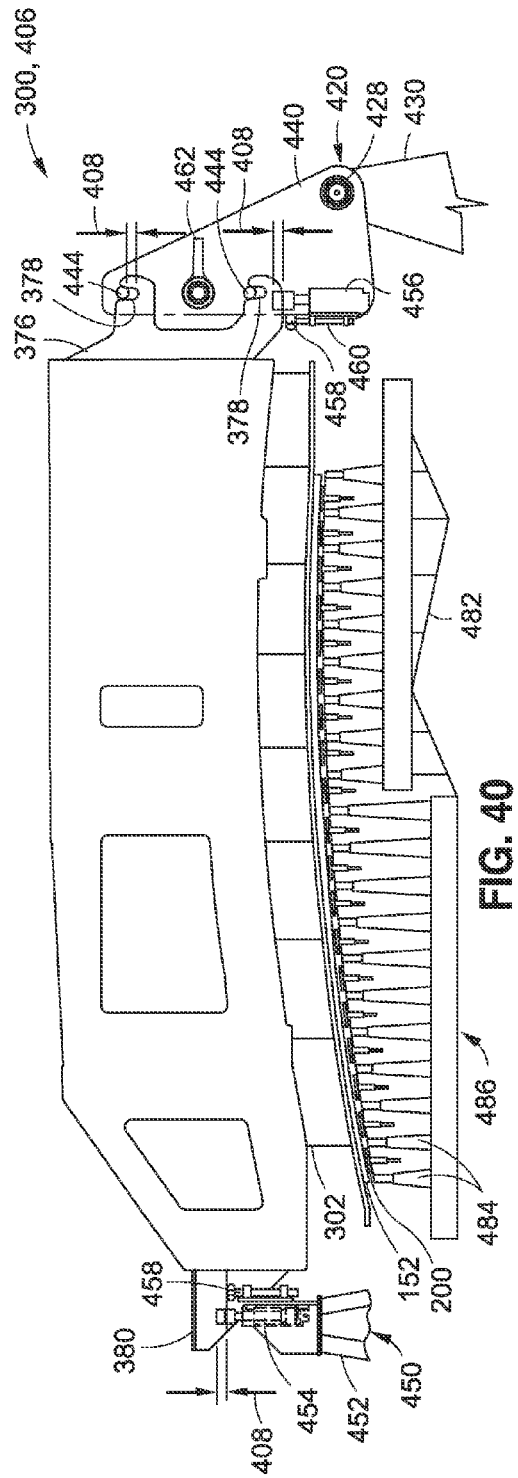
FIG. 40 is an end view of the system showing the strongback and the caul plate in a docked position with the stiffener tooling assembly.

FIG. 39 shows the caul plate 302 and strongback 370 in the hover position 404 and a gap 408 between the composite skin 152 and the composite stiffeners 200. In the hover position 404, at least a portion of the mass of the strongback 370 may be supported by one or more linear actuators 456 that may be included with one or more hinges 420 and/or one or more posts 452. The rotation of the strongback 370 may be facilitated by one or more rotational actuators 434 (FIG. 26) that may be included with one or more hinges 420 to which the strongback 370 may be coupled as described above. For example, the step of rotating the strongback 370 and caul plate 302 may include actuating a first rotational actuator 436 (FIG. 26) and a second rotational actuator 438 (FIG. 26) that may be included with each one of the hinges 420 supporting the strongback 370.

Step 510 of the method may include moving the composite skin 152 and the composite stiffeners 200 into contact with one another after the caul plate 302 and the stiffener tooling assembly 480 are rotated into the hover position 404. The rotational actuators 434 may be actuated for initial rotation of the strongback 370 and caul plate 302 from the open position 400 to the closed position 402 which may be a hover position 404 located up to several inches or more above the stiffener tooling assembly 480. In the hover position 404, a gap 408 may exist between the composite skin 152 and the composite stiffeners 200 as shown in FIG. 39.

Once in the hover position 404, the mechanical stop 458 or lever 462 that may be included with each hinge 420 may be rotated from a locked position (FIG. 39) to an unlocked position (FIG. 40) to permit gravity-induced vertical motion of the strongback attach fitting 376 relative to the strongback mounting pins 444 under the control of the linear actuators 456 (hydraulic cylinders 464) to remove the gap 408 between the composite skin 152 and the composite stiffeners 200. In addition, any mechanical stops 458 that may be included with the hinges 420 and/or posts 452 may be adjusted to allow for the linear actuators 456 to permit gravity-induced vertical motion of the strongback 370 and caul plate 302 from the hover position 404 to the docked position 406 until the gap 408 is removed and the composite skin 152 is moved into contact with the composite stiffeners 200. The mechanical stops 458 that may be included with the hinges 420 and/or posts 452 may be adjusted to a position such that in the event of failure of one or more of the linear actuators 456 (hydraulic cylinders 464) of the hinges 420 and/or posts 452, the mechanical stops 458 may support the mass of the strongback 370 against further vertical motion and thereby prevent the weight of the strongback 370 from being transferred to the caul plate 302 or stiffener tooling assembly 480.

The process of docking the caul plate 302 to the stiffener tooling assembly 480 may also include aligning, using at least one alignment mechanism 350 (FIGS. 22-23), the caul plate 302 with the stiffener tooling assembly 480. In this regard, the step of aligning the caul plate 302 with the stiffener tooling assembly 480 may include detecting, using a computer aided metrology (CAM) device (e.g., a laser measurement device 352—FIGS. 22-23), misalignment of the composite skin 152 with the composite stiffeners 200 based on the location of the hinge axes 428 as a reference point for the alignment mechanism 350, as described above. The method may further include adjusting the x-y position of the stiffener tooling assembly 480 relative to the caul plate 302 until the composite skin 152 is aligned with the composite stiffeners 200.

As indicated above, adjustment of the x-y position of the stiffener tooling assembly 480 may be facilitated by using one or more dollies (not shown) or remotely guided vehicles (not shown) which may be positioned underneath the bond cart 486. Upon command such as via remote control, such automated guided vehicles may lift the bond cart 486 a slight amount (e.g., up to several inches) in the vertical or z-direction to allow for positioning of the stiffener tooling assembly 480 in the x-y direction until the composite skin 152 is aligned with the composite stiffeners 200 based upon offset measurements from the alignment mechanism 350. Once the composite skin 152 is aligned with the composite stiffeners 200, the automated guided vehicles may be commanded to vertically lower the bond cart 486 back down onto the shop floor.

Step 512 of the method may include counterbalancing, using a counterbalancing system 450, at least a portion of the mass of the strongback 370 as the composite skin 152 and the composite stiffeners 200 are moved into contact with one another, as mentioned above. As shown in FIGS. 39-40, the method may include vertically lowering the strongback 370 and the caul plate 302 from the hover position 404 to the docked position 406 until the composite skin 152 and composite stiffeners 200 are in contact with one another. The process of vertically lowering the strongback 370 may include supporting and lowering the strongback 370 the above-described linear actuators 456 positioned along a perimeter of the strongback 370.

As indicated above, each one of the hinges 420 may include a linear actuator 456 (e.g., hydraulic cylinders 464). Likewise, each one of the posts 452 may include a linear actuator 456. The linear actuators 456 may be part of the hydraulic system 454 (FIG. 27) and may be independently operated in cooperation with one another to support the mass of the strongback 370 and lower the strongback 370 and caul plate 302 into docking engagement with the stiffener tooling assembly 480. The linear actuators 456 of the counterbalancing system 450 may advantageously prevent a substantial portion of the mass of the strongback 370 or an entirety of the mass of the strongback 370 from being transferred to the caul plate 302, the composite skin 152, the composite stiffeners 200, and/or the stiffener tooling 482.

The step of counterbalancing the mass of the strongback 370 may include regulating, using a hydraulic pressure controller 468, the hydraulic pressure at the hydraulic cylinders 464 (linear actuators 456) during the vertical positioning of the strongback 370. As shown in FIG. 27, the hydraulic cylinders 464 may be fluidly coupled to and/or controlled by a hydraulic pressure controller 468. The hydraulic pressure controller 468 may regulate hydraulic pressure at each hydraulic cylinder 464 such that the hydraulic pressure at each hydraulic cylinder 464 is apportioned according to the local mass fraction of the strongback 370 at each hydraulic cylinder 464.

Figure 41:
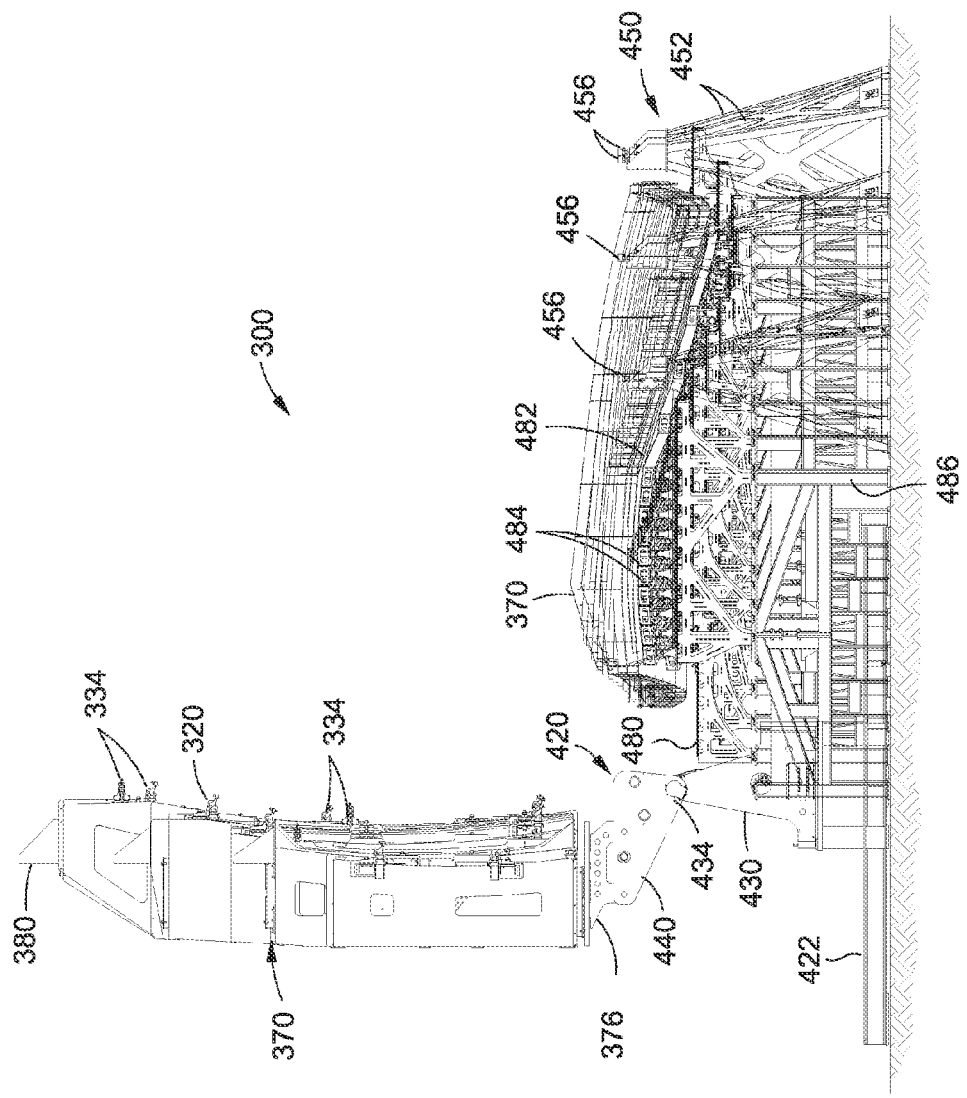
FIG. 41 is an end view of the system showing the strongback decoupled from the caul plate and rotated from the closed position back toward the open position.
Figure 42:
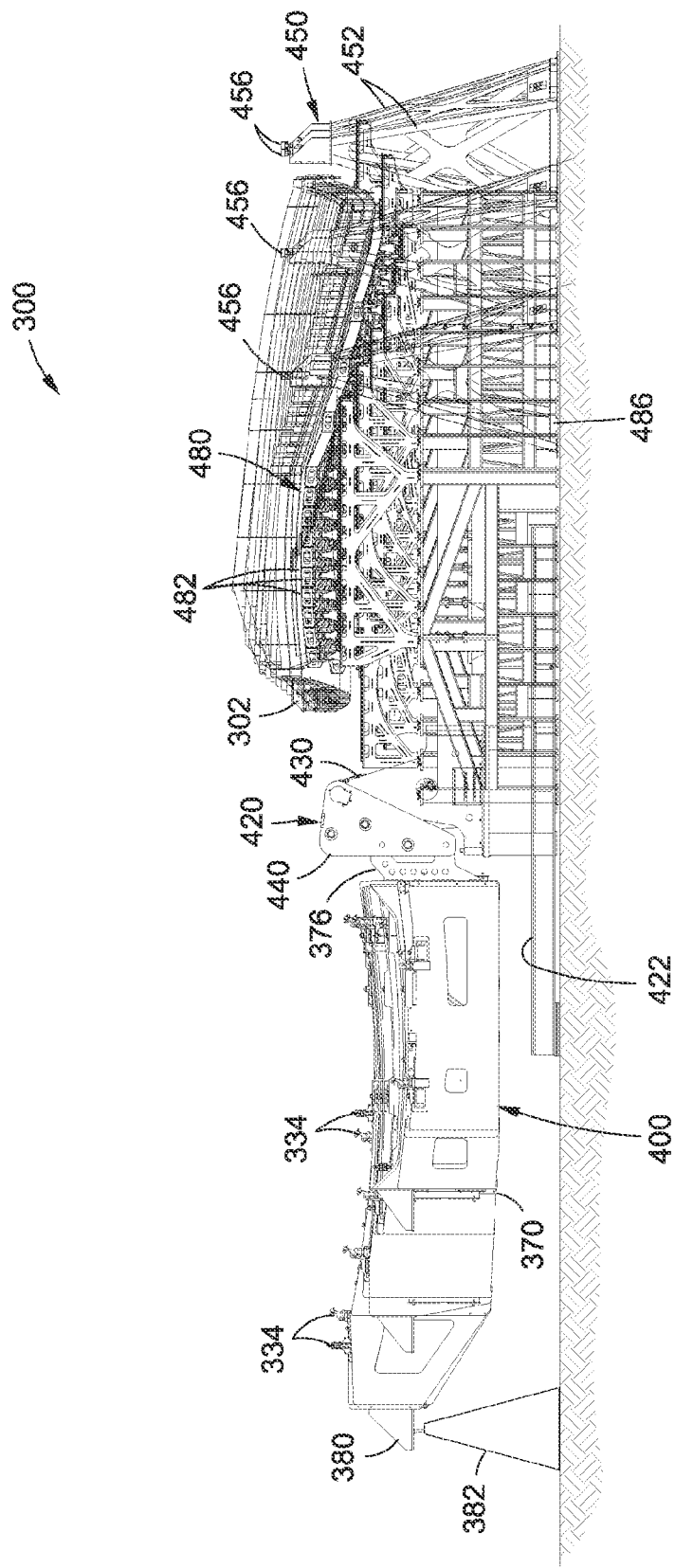
FIG. 42 is an end view of the system showing the strongback in the open position.

Step 514 of the method may include detaching (e.g., unclamping) the strongback 370 from the caul plate 302 and rotating the strongback 370 to the open position 400, as shown in FIG. 41-42. The method may further include vacuum bagging (not shown) the composite assembly (e.g., the composite skin 152 and composite stiffeners 200) by sealing the composite assembly to the caul plate 302 using a bagging film (not shown) sealed to the caul plate 302 perimeter 314. Vacuum pressure (not shown) may be applied to the bagging film to apply at least one or more atmospheres of compaction pressure (e.g., autoclave pressure) onto the composite skin 152 and composite stiffeners 200 which are supported by the stiffener tooling 482.

Step 516 of the method may include co-curing or co-bonding the composite skin 152 to the composite stiffeners 200 with the caul plate 302 engaged to the stiffener tooling assembly 480 and the strongback 370 detached from the caul plate 302. As mentioned above, one or more dollies or automated guided vehicles (not shown) may transport the assembly (e.g., the bond cart, the stiffener tooling 482, the composite stiffeners 200, the composite skin 152, and the caul plate 302) to an oven or autoclave for debulking and/or co-curing and/or co-bonding the composite skin 152 to the composite stiffeners 200.

After co-curing or co-bonding, the assembly may be removed from the oven (not shown) or autoclave (not shown) such as by using the automated guided vehicles (not shown) and which may position the assembly adjacent to the strongback in the open position. The alignment system 350 may be activated for aligning the stiffener tooling assembly with the hinge axes 428 of the hinges 420 to which the caul plate 370 is attached. The rotational actuators 434 (e.g., the first and second rotational actuators 436, 438) may be activated to rotate the strongback 370 (FIG. 21) from the open position 400 to the hover position 404. The linear actuators 456 at the hinges 420 and posts 452 may be regulated be the hydraulic system 454 to support the mass of the strongback 370 while vertically lowering the strongback 370 into engagement with the caul plate 302.

The indexing mechanisms 320 (FIGS. 13-14) may facilitate the alignment of the strongback with the caul plate such as by using the above-mentioned ball fixtures 322 and corresponding socket fixtures 328. Once the strongback 370 is engaged to the caul plate 302, one or more of the clamp arms 336 (FIGS. 15-16) may be actuated to clamp the caul plate 302 to the strongback 370. After clamping the caul plate 302 to the strongback 370, the assembly may be vertically raised to the hover position 404 such as by using the linear actuators 456. The rotational actuators 434 of the hinges may then be activated then to rotate the strongback 370 and caul plate 302 into the open position 400, leaving the cured stiffened composite skin panel 150 supported on the stiffener tooling 482 for post-processing such as inspection.

Additional modifications and improvements of the present disclosure may be apparent to those of ordinary skill in the art. Thus, the particular combination of parts described and illustrated herein is intended to represent only certain examples of the present disclosure and is not intended to serve as limitations of alternative examples or devices within the spirit and scope of the disclosure.

What is claimed is:

1. A system for manufacturing a stiffened composite skin panel, comprising:
a stiffener tooling assembly including stiffener tooling configured to support a plurality of composite stiffeners;
a caul plate having a layup surface for laying up a composite skin;
a strongback releasably coupled to the caul plate;
a plurality of hinges each having a fixed hinge portion and a movable hinge portion, the movable hinge portion being coupled to the strongback for rotating between an open position and a closed position for engagement of the caul plate with the stiffener tooling assembly; and
a plurality of clamps configured to releasably clamp the strongback to the caul plate during rotation of the strongback and caul plate from the open position toward the closed position, the clamps configured to release the strongback from the caul plate when the caul plate is supported above the stiffener tooling assembly, thereby allowing the hinges to rotate the strongback back toward the open position without the caul plate.

2. The system of claim 1, further including:
a counterbalancing system configured to counterbalance at least a portion of a mass of the strongback when the composite skin and the composite stiffeners are moved into contact with one another.

3. The system of claim 2, wherein:
the counterbalancing system includes a plurality of linear actuators positioned along a strongback perimeter of the strongback; and
the linear actuators being configured to vertically move the strongback and the caul plate between a hover position and a docked position, the composite skin and composite stiffeners contacting one another in the docked position.

4. The system of claim 3, wherein the counterbalancing system includes:
a plurality of posts positioned along a strongback perimeter of the strongback; and
one or more of the posts including a linear actuator.

5. The system of claim 3, wherein:
the linear actuators are configured as hydraulic cylinders fluidly coupled to a hydraulic pressure controller configured to regulate hydraulic pressure at each hydraulic cylinder.

6. The system of claim 1, further including:
one or more rotational actuators mounted to at least one of the hinges and configured to rotate the strongback.

7. The system of claim 1, further comprising:
at least one indexing mechanism configured to index the strongback with the caul plate.

8. The system of claim 7, wherein:
the indexing mechanism includes a ball fixture and a socket fixture mounted to the strongback and the caul plate.

9. The system of claim 1, further comprising:
at least one alignment mechanism configured to align the caul plate to the stiffener tooling assembly, or vice versa.

10. A system for manufacturing a stiffened composite skin panel, comprising:
a stiffener tooling assembly including stiffener tooling configured to support a plurality of composite stiffeners;
a caul plate having a layup surface for supporting a composite skin;
a strongback;
a plurality of clamps configured to releasably clamp the strongback to the caul plate;
a plurality of hinges each having a linear actuator, a fixed hinge portion, and a movable hinge portion, the fixed hinge portion being coupled to a fixed object, the movable hinge portion being coupled to the strongback for rotation thereof between an open position and a closed position for engagement of the caul plate to the stiffener tooling assembly;
a plurality of linear actuators positioned on one or more sides side of the strongback when in the closed position;
the linear actuators cooperating to vertically lower the strongback and caul plate from a hover position to a docked position in which the composite skin is in contact with the composite stiffeners; and
the plurality of clamps are configured to clamp the strongback to the caul plate during rotation of the strongback and caul plate from the open position toward the closed position; and configured to release the strongback from the caul plate when the caul plate is supported by the linear actuators above the stiffener tooling assembly, thereby allowing the hinges to rotate the strongback back toward the open position without the caul plate.

11. A method for manufacturing a stiffened composite skin panel, comprising:
providing a caul plate including a layup surface supporting a composite skin;
providing a composite stiffener assembly including one or more composite stiffeners laid up on stiffener tooling;
releasably clamping, using a plurality of clamps, a strongback to the caul plate; and
rotating, using a plurality of hinges, the strongback coupled to the caul plate from an open position to a closed position for engagement of the composite skin with the composite stiffeners to form a stiffened composite skin panel, each one of the hinges having a fixed hinge portion and a movable hinge portion, the fixed hinge portion being coupled to a fixed object, the movable hinge portion being coupled to the strongback; and the plurality of clamps are configured to clamp the strongback to the caul plate during rotation of the strongback and caul plate from the open position toward the closed position; and configured to release the strongback from the caul plate when the caul plate is supported by the linear actuators above the stiffener tooling assembly, thereby allowing the hinges to rotate the strongback back toward the open position without the caul plate.

12. The method of claim 11, further including:

detaching the strongback from the caul plate and rotating the strongback toward the open position after engagement of the composite skin with the composite stiffeners.

13. The method of claim 11, further including:

counterbalancing, using a counterbalancing system, at least a portion of a mass of the strongback when the composite skin and the composite stiffeners are moved into contact with one another.

14. The method of claim 13, wherein the step of counterbalancing the strongback includes:

vertically lowering the strongback and the caul plate from a hover position to a docked position until the composite skin contacts the composite stiffeners.

15. The method of claim 14, wherein the step of vertically lowering the strongback includes:

supporting and lowering the strongback using one or more linear actuators positioned along a perimeter of the strongback.

16. The method of claim 15, wherein the linear actuators are hydraulic cylinders, the step of counterbalancing the mass of the strongback includes:

regulating, using a hydraulic pressure controller, hydraulic pressure in the hydraulic cylinders such that the hydraulic pressure at each hydraulic cylinder is apportioned according to a local mass fraction of the strongback.

17. The method of claim 11, further including:

aligning, using at least one alignment mechanism, the caul plate with the stiffener tooling assembly when moving the composite skin and the composite stiffeners into contact with one another.

18. The method of claim 11, wherein the step of rotating the strongback coupled to the caul plate includes:

rotating, using a first rotational actuator and a second rotational actuator of at least one of the hinges, the strongback coupled to the caul plate.

19. The method of claim 11, further including:

indexing, using at least one indexing mechanism, the strongback with the caul plate.

20. The method of claim 19, wherein the step of indexing the strongback with the caul plate includes:

engaging a ball fixture with a socket fixture respectively mounted to the strongback and the caul plate, or vice versa.

21. A system for manufacturing a stiffened composite skin panel, comprising:

a stiffener tooling assembly including stiffener tooling configured to support a plurality of composite stiffeners;

a caul plate having a layup surface for laying up a composite skin;

a strongback releasably coupled to the stiffener tooling assembly;

a plurality of hinges each having a fixed hinge portion and a movable hinge portion, the movable hinge portion being coupled to the stiffener tooling assembly for rotating between an open position and a closed position for engagement of the caul plate with the stiffener tooling assembly; and a plurality of clamps configured to releasably clamp the strongback to the stiffener tooling assembly during rotation of the strongback and stiffener tooling assembly from the open position toward the closed position, the clamps configured to release the strongback from the stiffener tooling assembly when the stiffener tooling assembly is supported above the caul plate, thereby allowing the hinges to rotate the strongback back toward the open position without the stiffener tooling assembly.

* * * * *